US012784283B2

(12) United States Patent
Lasserre

(10) Patent No.: US 12,784,283 B2
(45) Date of Patent: Nov. 3, 2026

(54) PARAMETRIZATION FOR VOXELIZING TRIANGLES IN POINT CLOUD CODING

(71) Applicant: Comcast Cable Communications, LLC, Philadelphia, PA (US)

(72) Inventor: Sébastien Lasserre, Thorigné-Fouillard (FR)

(73) Assignee: Comcast Cable Communications, LLC, Philadelphia, PA (US)

( * ) Notice: Subject to any disclaimer, the term of this patent is extended or adjusted under 35 U.S.C. 154(b) by 196 days.

(21) Appl. No.: 18/441,832

(22) Filed: Feb. 14, 2024

(65) Prior Publication Data

US 2024/0273770 A1 Aug. 15, 2024

Related U.S. Application Data

(60) Provisional application No. 63/445,684, filed on Feb. 14, 2023.

(51) Int. Cl.

| | |
|---|---|
| ***G06T 9/00*** | (2006.01) |
| ***G06T 7/13*** | (2017.01) |
| ***G06T 7/60*** | (2017.01) |

(52) U.S. Cl.

CPC ................ *G06T 9/001* (2013.01); *G06T 7/13* (2017.01); *G06T 7/60* (2013.01); *G06T 2207/10016* (2013.01); *G06T 2207/10028* (2013.01); *G06T 2210/56* (2013.01)

(58) Field of Classification Search

CPC .. G06T 9/001; G06T 7/13; G06T 7/60; G06T 2207/10016; G06T 2207/10028; G06T 2210/56; G06T 17/00

USPC .......................................................... 345/419

See application file for complete search history.

(56) References Cited

U.S. PATENT DOCUMENTS

| | | | | |
|---|---|---|---|---|
| 11,657,543 | B2 * | 5/2023 | Ray | G06T 9/005 382/239 |
| 2021/0067805 | A1 * | 3/2021 | Vosoughi | H04N 19/1883 |
| 2021/0209812 | A1 * | 7/2021 | Han | H04N 19/1883 |
| 2021/0211721 | A1 * | 7/2021 | Park | H04N 19/46 |
| 2021/0407142 | A1 * | 12/2021 | Hur | H04N 19/30 |
| 2022/0122265 | A1 * | 4/2022 | Zhang | H04N 19/119 |

(Continued)

FOREIGN PATENT DOCUMENTS

WO WO-2021207510 A1 * 10/2021 ............... G06T 9/20

OTHER PUBLICATIONS

Dricot et al. ("Adaptive Multi-level Triangle Soup for Geometry-based Point Cloud Coding"); 2019; IEEE (Year: 2019).*

(Continued)

*Primary Examiner* — David T Welch

(74) *Attorney, Agent, or Firm* — Banner & Witcoff, Ltd.

(57) ABSTRACT

TriSoup triangles may be used to model a point cloud. Some points may be missed when modeling the point cloud. Missed points may be recovered by identifying points that are contained within one or more extensions of a TriSoup triangle. One or more parameters may be used for voxelizing the one or more extensions of the triangle. Instead of using a fixed value for parameters for all point clouds or portions of a point cloud, one or more of parameters may be determined based on local characteristics of a triangle. By dynamically determining parameters, consistency of voxelizing triangles may be achieved, and/or a visual quality of decoded point cloud data may be improved.

20 Claims, 20 Drawing Sheets

(56) References Cited

U.S. PATENT DOCUMENTS

| | | | | |
|---|---|---|---|---|
| 2022/0130075 | A1* | 4/2022 | Oh | G06T 17/00 |
| 2022/0207781 | A1* | 6/2022 | Zhang | H04N 19/85 |
| 2022/0210466 | A1* | 6/2022 | Pham Van | H04N 19/124 |
| 2022/0327743 | A1* | 10/2022 | Oh | G06T 3/00 |
| 2022/0377327 | A1* | 11/2022 | Park | H04N 19/167 |
| 2022/0383552 | A1* | 12/2022 | Hur | G06T 9/004 |
| 2022/0383553 | A1* | 12/2022 | Park | G06T 9/40 |
| 2023/0164353 | A1* | 5/2023 | Lee | H04N 19/105<br>375/240.26 |
| 2023/0196663 | A1 | 6/2023 | Tian et al. | |
| 2023/0224508 | A1* | 7/2023 | Unno | H04N 19/597<br>382/240 |
| 2023/0237705 | A1* | 7/2023 | Wan | H04N 19/96<br>382/232 |
| 2023/0260163 | A1* | 8/2023 | Lee | G06T 9/40<br>345/419 |
| 2023/0306646 | A1* | 9/2023 | Martemianov | G06T 9/001 |
| 2023/0306684 | A1 | 9/2023 | Graziosi et al. | |
| 2023/0316581 | A1* | 10/2023 | Lee | H04N 19/57<br>375/240.01 |
| 2023/0334711 | A1* | 10/2023 | Oh | H04N 21/4402 |
| 2023/0394712 | A1* | 12/2023 | Park | G06T 9/001 |
| 2023/0418288 | A1* | 12/2023 | Greiner | G05D 1/2465 |
| 2023/0419552 | A1* | 12/2023 | Oh | H04N 19/96 |
| 2024/0087176 | A1* | 3/2024 | Zhu | G06T 9/001 |
| 2025/0095211 | A1* | 3/2025 | Oh | H04N 19/597 |
| 2025/0200817 | A1* | 6/2025 | Taquet | H04N 19/159 |
| 2025/0209677 | A1* | 6/2025 | Ito | G06T 9/40 |
| 2025/0225680 | A1* | 7/2025 | Yu | H04N 19/597 |
| 2025/0234024 | A1* | 7/2025 | Taquet | H04N 19/597 |
| 2025/0245863 | A1* | 7/2025 | Gao | G06T 9/001 |
| 2025/0252610 | A1* | 8/2025 | Gao | H04N 19/597 |
| 2025/0337924 | A1* | 10/2025 | Sun | H04N 19/167 |
| 2025/0349038 | A1* | 11/2025 | Yu | H04N 19/96 |

OTHER PUBLICATIONS

Wang et al. ("Point-Voting based Point Cloud Geometry Compression"); 2021; IEEE (Year: 2021).*

M59292, MPEG Meeting, Apr. 24, 2022, Source: Xiaomi, Sebastien Lasserre, Title: [GPCC][TriSoup] Part 5 Improved Rendering from Triangles.

M60017, MPEG Meeting, Jul. 20, 2022, Source: Xiaomi, S. Gao, S. Lasserre, Title: [GPCC][EE13.50 Related] Adaptive Halo in Voxelization of TriSoup Model.

ISO/IEC JTC 1/SC 29/WG 7 M60979: Mainz, DE, Oct. 2022, Source: Xiaomi, Title: G-PCC EE13.50 Test 1 Improve Adapative Halo in Voxelization of Trisoup Model.

M61982, MPEG Meeting, Feb. 16, 2023, Source: Ofinno, Sebastien Lasserre, Title: [GPCC] On the Voxelization of TriSoup Triangles.

Jun. 5, 2024—International Search Report—WO. App. No. PCT/US2024/015751.

* cited by examiner

PARAMETRIZATION FOR VOXELIZING TRIANGLES IN POINT CLOUD CODING

CROSS-REFERENCE TO RELATED APPLICATIONS

This application claims the benefit of U.S. Provisional Application No. 63/445,684 filed on Feb. 14, 2023. The above referenced application is hereby incorporated by reference in its entirety.

BACKGROUND

An object or scene uses volumetric visual data consisting of a series of points. The points are stored in a point cloud format that includes a collection of points in three-dimensional space. As point clouds can get quite large in data size, transmitting and processing point cloud data needs a data compression scheme that is designed with respect to the unique characteristics of point cloud data.

SUMMARY

The following summary presents a simplified summary of certain features. The summary is not an extensive overview and is not intended to identify key or critical elements.

Point clouds may be modeled using sets of triangles (e.g., a triangle soup (TriSoup) method). A triangle may be voxelized by determining voxels that are within the triangle. To provide continuity of the triangles, the vertices of the triangle may need to be quantized, which may result in occupied voxels being missed. Voxels within one or more extensions of the triangle may be determined to recapture missed voxels. One or more parameters may be used for voxelizing the one or more extensions of the triangle. Instead of using a fixed value for parameters for all point clouds or portions of a point cloud, one or more parameters may be determined based on local characteristics of a triangle. The local characteristics of the triangle may comprise, for example, edge lengths of the triangle, triangle size, node size, etc. A parameter may be determined, for example, based on a value representative of one or more edge lengths of the triangle. By using dynamically determined parameters, consistency of voxelization of triangles may be achieved and/or visual quality of decoded point cloud data may be improved.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1:
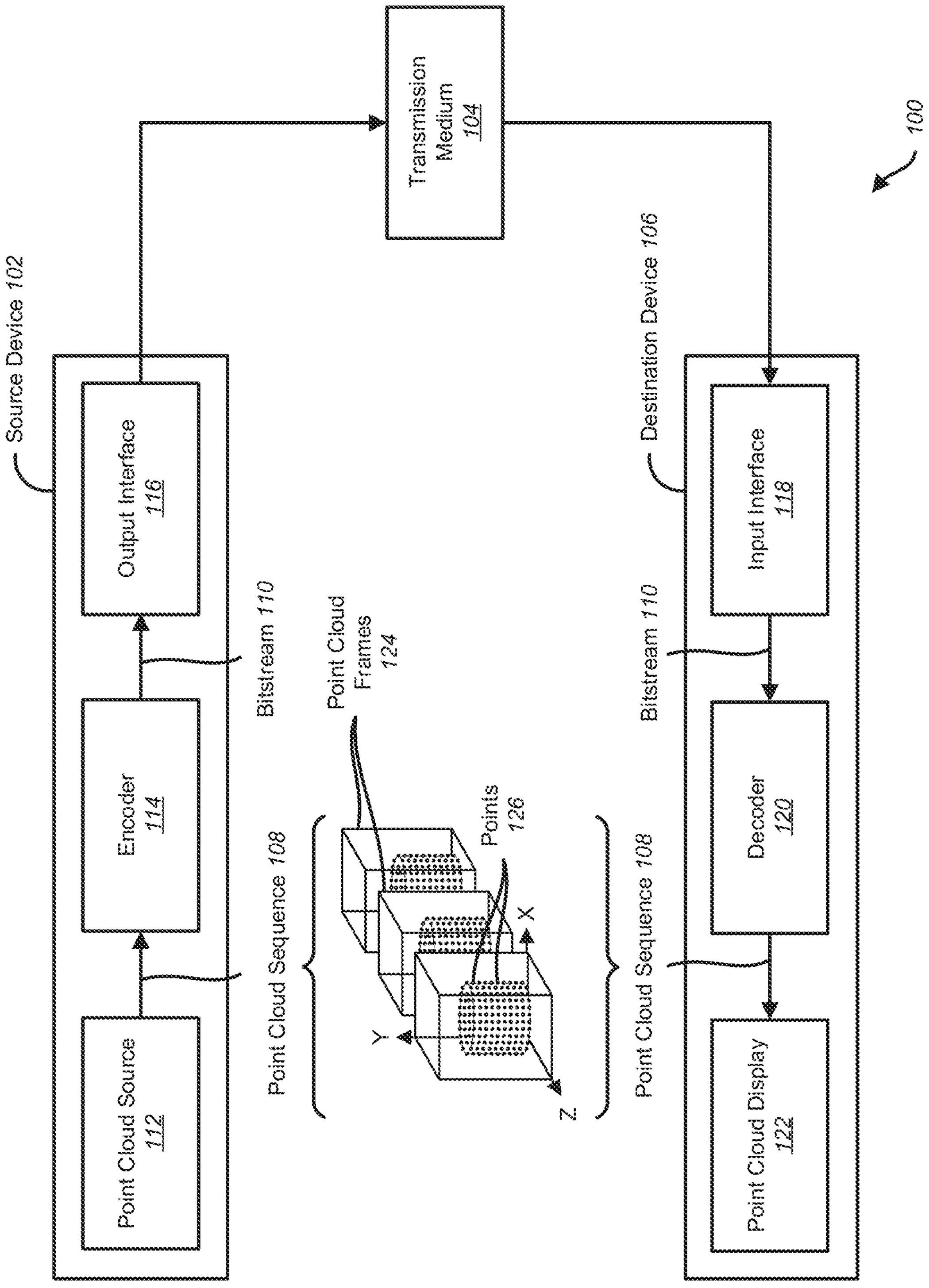
FIG. 1 shows an example point cloud coding system.

The accompanying drawings and descriptions provide examples. It is to be understood that the examples shown in the drawings and/or described are non-exclusive, and that features shown and described may be practiced in other examples. Examples are provided for operation of point cloud or point cloud sequence encoding or decoding systems. More particularly, the technology disclosed herein may relate to point cloud compression as used in encoding and/or decoding devices and/or systems.

At least some visual data may describe an object or scene using a series of points. Each point may comprise a position in two dimensions (x and y) and one or more optional attributes like color. Volumetric visual data may add another positional dimension to these visual data. For example, volumetric visual data may describe an object or scene using a series of points that each may comprise a position in three dimensions (x, y, and z) and one or more optional attributes like color, reflectance, time stamp, etc. Volumetric visual data may provide a more immersive way to experience visual data, for example, compared to the at least some visual data. For example, an object or scene described by volumetric visual data may be viewed from any (or multiple) angles, whereas the at least some visual data may generally only be viewed from the angle in which it was captured or rendered.

Volumetric visual data may be used in many applications, including augmented reality (AR), virtual reality (VR), and mixed reality (MR). Sparse volumetric visual data may be used in the automotive industry for the representation of three-dimensional (3D) maps (e.g., cartography) or as input to assisted driving systems. In the case of assisted driving systems, volumetric visual data may be typically input to driving decision algorithms. Volumetric visual data may be used to store valuable objects in digital form. In applications for preserving cultural heritage, a goal may be to keep a representation of objects that may be threatened by natural disasters. For example, statues, vases, and temples may be entirely scanned and stored as volumetric visual data having several billions of samples. This use-case for volumetric visual data may be particularly relevant for valuable objects in locations where earthquakes, tsunamis and typhoons are frequent. Volumetric visual data may take the form of a volumetric frame. The volumetric frame may describe an object or scene captured at a particular time instance. Volumetric visual data may take the form of a sequence of volumetric frames (referred to as a volumetric sequence or volumetric video). The sequence of volumetric frames may describe an object or scene captured at multiple different time instances.

Volumetric visual data may be stored in various formats. One format for storing volumetric visual data may be point clouds. A point cloud may comprise a collection of points in 3D space. Each point in a point cloud may comprise geometry information that may indicate the point's position in 3D space. For example, the geometry information may indicate the point's position in 3D space, for example, using three Cartesian coordinates (x, y, and z) and/or using spherical coordinates (r, phi, theta) (e.g., if acquired by a rotating sensor). The positions of points in a point cloud may be quantized according to a space precision. The space precision may be the same or different in each dimension. The quantization process may create a grid in 3D space. One or more points residing within each sub-grid volume may be mapped to the sub-grid center coordinates, referred to as voxels. A voxel may be considered as a 3D extension of pixels corresponding to the 2D image grid coordinates. For example, similar to a pixel being the smallest unit when dividing the 2D space (or 2D image) into discrete, uniform (e.g., equally sized) regions, a voxel may be the smallest unit of volume when dividing 3D space into discrete, uniform regions. The sub-grid center coordinates (which correspond to voxels) may be referred to as a voxelized grid. A point in a point cloud may comprise one or more types of attribute information. Attribute information may indicate a property of a point's visual appearance. For example, attribute information may indicate a texture (e.g., color) of the point, a material type of the point, transparency information of the point, reflectance information of the point, a normal vector to a surface of the point, a velocity at the point, an acceleration at the point, a time stamp indicating when the point was captured, or a modality indicating how the point was captured (e.g., running, walking, or flying). A point in a point cloud may comprise light field data in the form of multiple view-dependent texture information. Light field data may be another type of optional attribute information.

The points in a point cloud may describe an object or a scene. For example, the points in a point cloud may describe the external surface and/or the internal structure of an object or scene. The object or scene may be synthetically generated by a computer. The object or scene may be generated from the capture of a real-world object or scene. The geometry information of a real-world object or a scene may be obtained by 3D scanning and/or photogrammetry. 3D scanning may include different types of scanning, for example, laser scanning, structured light scanning, and/or modulated light scanning. 3D scanning may obtain geometry information. 3D scanning may obtain geometry information, for example, by moving one or more laser heads, structured light cameras, and/or modulated light cameras relative to an object or scene being scanned. Photogrammetry may obtain geometry information. Photogrammetry may obtain geometry information, for example, by triangulating the same feature or point in different spatially shifted 2D photographs. Point cloud data may take the form of a point cloud frame. The point cloud frame may describe an object or scene captured at a particular time instance. Point cloud data may take the form of a sequence of point cloud frames. The sequence of point cloud frames may be referred to as a point cloud sequence or point cloud video. The sequence of point cloud frames may describe an object or scene captured at multiple different time instances.

The data size of a point cloud frame or point cloud sequence may be excessive (e.g., too large) for storage and/or transmission in many applications. For example, a single point cloud may comprise over a million points or even billions of points. Each point may comprise geometry information and one or more optional types of attribute information. The geometry information of each point may comprise three Cartesian coordinates (x, y, and z) and/or spherical coordinates (r, phi, theta) that may be each represented, for example, using at least 10 bits per component or 30 bits in total. The attribute information of each point may comprise a texture corresponding to a plurality of (e.g., three) color components (e.g., R, G, and B color components). Each color component may be represented, for example, using 8-10 bits per component or 24-30 bits in total. For example, a single point may comprise at least 54 bits of information, with at least 30 bits of geometry information and at least 24 bits of texture. If a point cloud frame includes a million such points, each point cloud frame may require 54 million bits or 54 megabits to represent. For dynamic point clouds that change over time, at a frame rate of 30 frames per second, a data rate of 1.32 gigabits per second may be required to send (e.g., transmit) the points of the point cloud sequence. Raw representations of point clouds may require a large amount of data, and the practical deployment of point-cloud-based technologies may need compression technologies that enable the storage and distribution of point clouds with a reasonable cost.

Encoding may be used to compress and/or reduce the data size of a point cloud frame or point cloud sequence to provide for more efficient storage and/or transmission. Decoding may be used to decompress a compressed point cloud frame or point cloud sequence for display and/or other forms of consumption (e.g., by a machine learning based device, neural network-based device, artificial intelligence-based device, or other forms of consumption by other types of machine-based processing algorithms and/or devices). Compression of point clouds may be lossy (introducing differences relative to the original data) for the distribution to and visualization by an end-user, for example, on AR or VR glasses or any other 3D-capable device. Lossy compression may allow for a high ratio of compression but may imply a trade-off between compression and visual quality perceived by an end-user. Other frameworks, for example, frameworks for medical applications or autonomous driving, may require lossless compression to avoid altering the results of a decision obtained, for example, based on the analysis of the sent (e.g., transmitted) and decompressed point cloud frame.

FIG. 1 shows an example point cloud coding (e.g., encoding and/or decoding) system 100. Point cloud coding system 100 may comprise a source device 102, a transmission medium 104, and a destination device 106. Source device 102 may encode a point cloud sequence 108 into a bitstream 110 for more efficient storage and/or transmission. Source device 102 may store and/or send (e.g., transmit) bitstream 110 to destination device 106 via transmission medium 104. Destination device 106 may decode bitstream 110 to display point cloud sequence 108 or for other forms of consumption (e.g., further analysis, storage, etc.). Destination device 106 may receive bitstream 110 from source device 102 via a storage medium or transmission medium 104. Source device 102 and destination device 106 may include any number of different devices. Source device 102 and destination device 106 may include, for example, a cluster of interconnected computer systems acting as a pool of seamless resources (also referred to as a cloud of computers or cloud computer), a server, a desktop computer, a laptop computer, a tablet computer, a smart phone, a wearable device, a television, a camera, a video gaming console, a set-top box, a video streaming device, a vehicle (e.g., an autonomous vehicle), or a head-mounted display. A head-mounted display may allow a user to view a VR, AR, or MR scene and adjust the view of the scene, for example, based on movement of the user's head. A head-mounted display may be connected (e.g., tethered) to a processing device (e.g., a server, a desktop computer, a set-top box, or a video gaming console) or may be fully self-contained.

A source device 102 may comprise a point cloud source 112, an encoder 114, and an output interface 116. A source device 102 may comprise a point cloud source 112, an encoder 114, and an output interface 116, for example, to encode point cloud sequence 108 into a bitstream 110. Point cloud source 112 may provide (e.g., generate) point cloud sequence 108, for example, from a capture of a natural scene and/or a synthetically generated scene. A synthetically generated scene may be a scene comprising computer generated graphics. Point cloud source 112 may comprise one or more point cloud capture devices, a point cloud archive comprising previously captured natural scenes and/or synthetically generated scenes, a point cloud feed interface to receive captured natural scenes and/or synthetically generated scenes from a point cloud content provider, and/or a processor(s) to generate synthetic point cloud scenes. The point cloud capture devices may include, for example, one or more laser scanning devices, structured light scanning devices, modulated light scanning devices, and/or passive scanning devices.

Point cloud sequence 108 may comprise a series of point cloud frames 124 (e.g., an example shown in FIG. 1). A point cloud frame may describe an object or scene captured at a particular time instance. Point cloud sequence 108 may achieve the impression of motion by using a constant or variable time to successively present point cloud frames 124 of point cloud sequence 108. A point cloud frame may comprise a collection of points (e.g., voxels) 126 in 3D space. Each point 126 may comprise geometry information that may indicate the point's position in 3D space. The geometry information may indicate, for example, the point's position in 3D space using three Cartesian coordinates (x, y, and z). One or more of points 126 may comprise one or more types of attribute information. Attribute information may indicate a property of a point's visual appearance. For example, attribute information may indicate, for example, a texture (e.g., color) of a point, a material type of a point, transparency information of a point, reflectance information of a point, a normal vector to a surface of a point, a velocity at a point, an acceleration at a point, a time stamp indicating when a point was captured, a modality indicating how a point was captured (e.g., running, walking, or flying), etc. One or more of points 126 may comprise, for example, light field data in the form of multiple view-dependent texture information. Light field data may be another type of optional attribute information. Color attribute information of one or more of points 126 may comprise a luminance value and two chrominance values. The luminance value may represent the brightness (e.g., luma component, Y) of the point. The chrominance values may respectively represent the blue and red components of the point (e.g., chroma components, Cb and Cr) separate from the brightness. Other color attribute values may be represented, for example, based on different color schemes (e.g., an RGB or monochrome color scheme).

Encoder 114 may encode point cloud sequence 108 into a bitstream 110. To encode point cloud sequence 108, encoder 114 may use one or more lossless or lossy compression techniques to reduce redundant information in point cloud sequence 108. To encode point cloud sequence 108, encoder 114 may use one or more prediction techniques to reduce redundant information in point cloud sequence 108. Redundant information is information that may be predicted at a decoder 120 and may not be needed to be sent (e.g., transmitted) to decoder 120 for accurate decoding of point cloud sequence 108. For example, Motion Picture Expert Group (MPEG) introduced a geometry-based point cloud compression (G-PCC) standard (ISO/IEC standard 23090-9: Geometry-based point cloud compression). G-PCC specifies the encoded bitstream syntax and semantics for transmission and/or storage of a compressed point cloud frame and the decoder operation for reconstructing the compressed point cloud frame from the bitstream. During standardization of G-PCC, a reference software (ISO/IEC standard 23090-21: Reference Software for G-PCC) was developed to encode the geometry and attribute information of a point cloud frame. To encode geometry information of a point cloud frame, the G-PCC reference software encoder may perform voxelization. The G-PCC reference software encoder may perform voxelization, for example, by quantizing positions of points in a point cloud. Quantizing positions of points in a point cloud may create a grid in 3D space. The G-PCC reference software encoder may map the points to the center coordinates of the sub-grid volume (e.g., voxel) that their quantized locations reside in. The G-PCC reference software encoder may perform geometry analysis using an occupancy tree to compress the geometry information. The G-PCC reference software encoder may entropy encode the result of the geometry analysis to further compress the geometry information. To encode attribute information of a point cloud, the G-PCC reference software encoder may use a transform tool, such as Region Adaptive Hierarchical Transform (RAHT), the Predicting Transform, and/or the Lifting Transform. The Lifting Transform may be built on top of the Predicting Transform. The Lifting Transform may include an extra update/lifting step. The Lifting Transform and the Predicting Transform may be referred to as Predicting/Lifting Transform or pred lift. Encoder 114 may operate in a same or similar manner to an encoder provided by the G-PCC reference software.

Output interface 116 may be configured to write and/or store bitstream 110 onto transmission medium 104. The bitstream 110 may be sent (e.g., transmitted) to destination device 106. In addition or alternatively, output interface 116 may be configured to send (e.g., transmit), upload, and/or stream bitstream 110 to destination device 106 via transmission medium 104. Output interface 116 may comprise a wired and/or wireless transmitter configured to send (e.g., transmit), upload, and/or stream bitstream 110 according to one or more proprietary, open-source, and/or standardized communication protocols. The one or more proprietary, open-source, and/or standardized communication protocols may include, for example, Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, 3rd Generation Partnership Project (3GPP) standards, Institute of Electrical and Electronics Engineers (IEEE) standards, Internet Protocol (IP) standards, Wireless Application Protocol (WAP) standards, and/or any other communication protocol.

Transmission medium 104 may comprise a wireless, wired, and/or computer readable medium. For example, transmission medium 104 may comprise one or more wires, cables, air interfaces, optical discs, flash memory, and/or magnetic memory. In addition or alternatively, transmission medium 104 may comprise one or more networks (e.g., the Internet) or file server(s) configured to store and/or send (e.g., transmit) encoded video data.

Destination device 106 may decode bitstream 110 into point cloud sequence 108 for display or other forms of consumption. Destination device 106 may comprise one or more of an input interface 118, a decoder 120, and/or a point cloud display 122. Input interface 118 may be configured to read bitstream 110 stored on transmission medium 104. Bitstream 110 may be stored on transmission medium 104 by source device 102. In addition or alternatively, input interface 118 may be configured to receive, download, and/or stream bitstream 110 from source device 102 via transmission medium 104. Input interface 118 may comprise a wired and/or wireless receiver configured to receive, download, and/or stream bitstream 110 according to one or more proprietary, open-source, standardized communication protocols, and/or any other communication protocol. Examples of the protocols include Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, 3rd Generation Partnership Project (3GPP) standards, Institute of Electrical and Electronics Engineers (IEEE) standards, Internet Protocol (IP) standards, and Wireless Application Protocol (WAP) standards.

Decoder 120 may decode point cloud sequence 108 from encoded bitstream 110. For example, decoder 120 may operate in a same or similar manner as a decoder provided by G-PCC reference software. Decoder 120 may decode a point cloud sequence that approximates a point cloud sequence 108. Decoder 120 may decode a point cloud sequence that approximates a point cloud sequence 108 due to, for example, lossy compression of the point cloud sequence 108 by encoder 114 and/or errors introduced into encoded bitstream 110, for example, if transmission to destination device 106 occurs.

Point cloud display 122 may display a point cloud sequence 108 to a user. The point cloud display 122 may comprise, for example, a cathode rate tube (CRT) display, a liquid crystal display (LCD), a plasma display, a light emitting diode (LED) display, a 3D display, a holographic display, a head-mounted display, or any other display device suitable for displaying point cloud sequence 108.

Point cloud coding (e.g., encoding/decoding) system 100 is presented by way of example and not limitation. Point cloud coding systems different from the point cloud coding system 100 and/or modified versions of the point cloud coding system 100 may perform the methods and processes as described herein. For example, the point cloud coding system 100 may comprise other components and/or arrangements. Point cloud source 112 may, for example, be external to source device 102. Point cloud display device 122 may, for example, be external to destination device 106 or omitted altogether (e.g., if point cloud sequence 108 is intended for consumption by a machine and/or storage device). Source device 102 may further comprise, for example, a point cloud decoder. Destination device 106 may comprise, for example, a point cloud encoder. For example, source device 102 may be configured to further receive an encoded bit stream from destination device 106. Receiving an encoded bit stream from destination device 106 may support two-way point cloud transmission between the devices.

As described herein, an encoder may quantize the positions of points in a point cloud according to a space precision, which may be the same or different in each dimension of the points. The quantization process may create a grid in 3D space. The encoder may map any points residing within each sub-grid volume to the sub-grid center coordinates, referred to as a voxel or a volumetric pixel. A voxel may be considered as a 3D extension of pixels corresponding to 2D image grid coordinates.

An encoder may represent or code a point cloud (e.g., a voxelized point cloud). An encoder may represent or code a voxelized point cloud, for example, using an occupancy tree. For example, the encoder may split the initial volume or cuboid containing the point cloud into sub-cuboids. The initial volume or cuboid may be referred to as a bounding box. A cuboid may be, for example, a cube. The encoder may recursively split each sub-cuboid that contains at least one point of the point cloud. The encoder may not further split sub-cuboids that do not contain at least one point of the point cloud. A sub-cuboid that contains at least one point of the point cloud may be referred to as an occupied sub-cuboid. A sub-cuboid that does not contain at least one point of the point cloud may be referred to as an unoccupied sub-cuboid. The encoder may split an occupied sub-cuboid into, for example, two sub-cuboids (to form a binary tree), four sub-cuboids (to form a quadtree), or eight sub-cuboids (to form an octree). The encoder may split an occupied sub-cuboid to obtain further sub-cuboids. The sub-cuboids may have the same size and shape at a given depth level of the occupancy tree. The sub-cuboids may have the same size and shape at a given depth level of the occupancy tree, for example, if the encoder splits the occupied sub-cuboid along a plane passing through the middle of edges of the sub-cuboid.

The initial volume or cuboid containing the point cloud may correspond to the root node of the occupancy tree. Each occupied sub-cuboid, split from the initial volume, may correspond to a node (of the root node) in a second level of the occupancy tree. Each occupied sub-cuboid, split from an occupied sub-cuboid in the second level, may correspond to a node (off the occupied sub-cuboid in the second level from which it was split) in a third level of the occupancy tree. The occupancy tree structure may continue to form in this manner for each recursive split iteration until, for example, some maximum depth level of the occupancy tree is reached or each occupied sub-cuboid has a volume corresponding to one voxel.

Each non-leaf node of the occupancy tree may comprise or be associated with an occupancy word representing the occupancy state of the cuboid corresponding to the node. For example, a node of the occupancy tree corresponding to a cuboid that is split into 8 sub-cuboids may comprise or be associated with a 1-byte occupancy word. Each bit (referred to as an occupancy bit) of the 1-byte occupancy word may represent or indicate the occupancy of a different one of the eight sub-cuboids. Occupied sub-cuboids may be each represented or indicated by a binary “1” in the 1-byte occupancy word. Unoccupied sub-cuboids may be each represented or indicated by a binary “0” in the 1-byte occupancy word. Occupied and un-occupied sub-cuboids may be represented or indicated by opposite 1-bit binary values (e.g., a binary "0" representing or indicating an occupied sub-cuboid and a binary "1" representing or indicating an unoccupied sub-cuboid) in the 1-byte occupancy word.

Each bit of an occupancy word may represent or indicate the occupancy of a different one of the eight sub-cuboids. Each bit of an occupancy word may represent or indicate the occupancy of a different one of the eight sub-cuboids, for example, following the so-called Morton order. For example, the least significant bit of an occupancy word may represent or indicate, for example, the occupancy of a first one of the eight sub-cuboids following the Morton order. The second least significant bit of an occupancy word may represent or indicate, for example, the occupancy of a second one of the eight sub-cuboids following the Morton order, etc.

Figure 2:
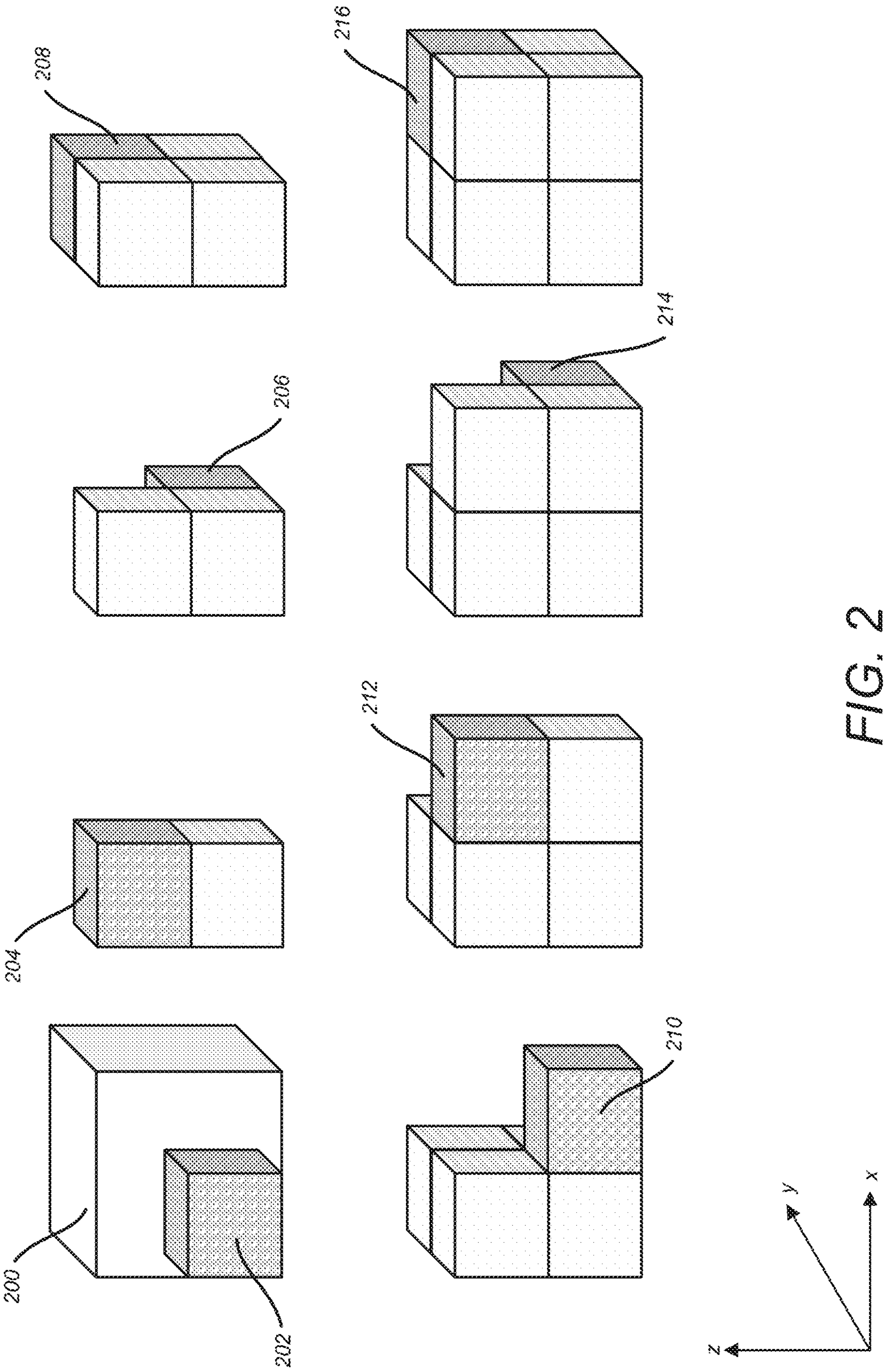
FIG. 2 shows an example Morton order.

FIG. 2 shows an example Morton order. More specifically, FIG. 2 shows a Morton order of eight sub-cuboids 202-216 split from a cuboid 200. Sub-cuboids 202-216 may be labeled, for example, based on their Morton order, with child node 202 being the first in Morton order and child node 216 being the last in Morton order. The Morton order for sub-cuboids 202-216 may be a local lexicographic order in xyz.

The geometry of a point cloud (e.g., a voxelized point cloud) may be represented by, and may be determined from, the initial volume and the occupancy words of the nodes in an occupancy tree. An encoder may send (e.g., transmit) the initial volume and the occupancy words of the nodes in the occupancy tree in a bitstream to a decoder for reconstructing the point cloud. The encoder may entropy encode the occupancy words. The encoder may entropy encode the occupancy words, for example, before sending (e.g., transmitting) the initial volume and the occupancy words of the nodes in the occupancy tree. The encoder may encode an occupancy bit of an occupancy word of a node corresponding to a cuboid. The encoder may encode an occupancy bit of an occupancy word of a node corresponding to a cuboid, for example, based on one or more occupancy bits of occupancy words of other nodes corresponding to cuboids that are adjacent or spatially close to the cuboid of the occupancy bit being encoded.

An encoder and/or a decoder may code (e.g., encode and/or decode) occupancy bits of occupancy words in sequence of a scan order. The scan order may also be referred to as a scanning order. For example, an encoder and/or a decoder may scan an occupancy tree in breadth-first order. All the occupancy words of the nodes of a given depth (e.g., level) within the occupancy tree may be scanned. All the occupancy words of the nodes of a given depth (e.g., level) within the occupancy tree may be scanned, for example, before scanning the occupancy words of the nodes of the next depth (e.g., level). Within a given depth, the encoder and/or decoder may scan the occupancy words of nodes in the Morton order. Within a given node, the encoder and/or decoder may scan the occupancy bits of the occupancy word of the node further in the Morton order.

Figure 3:
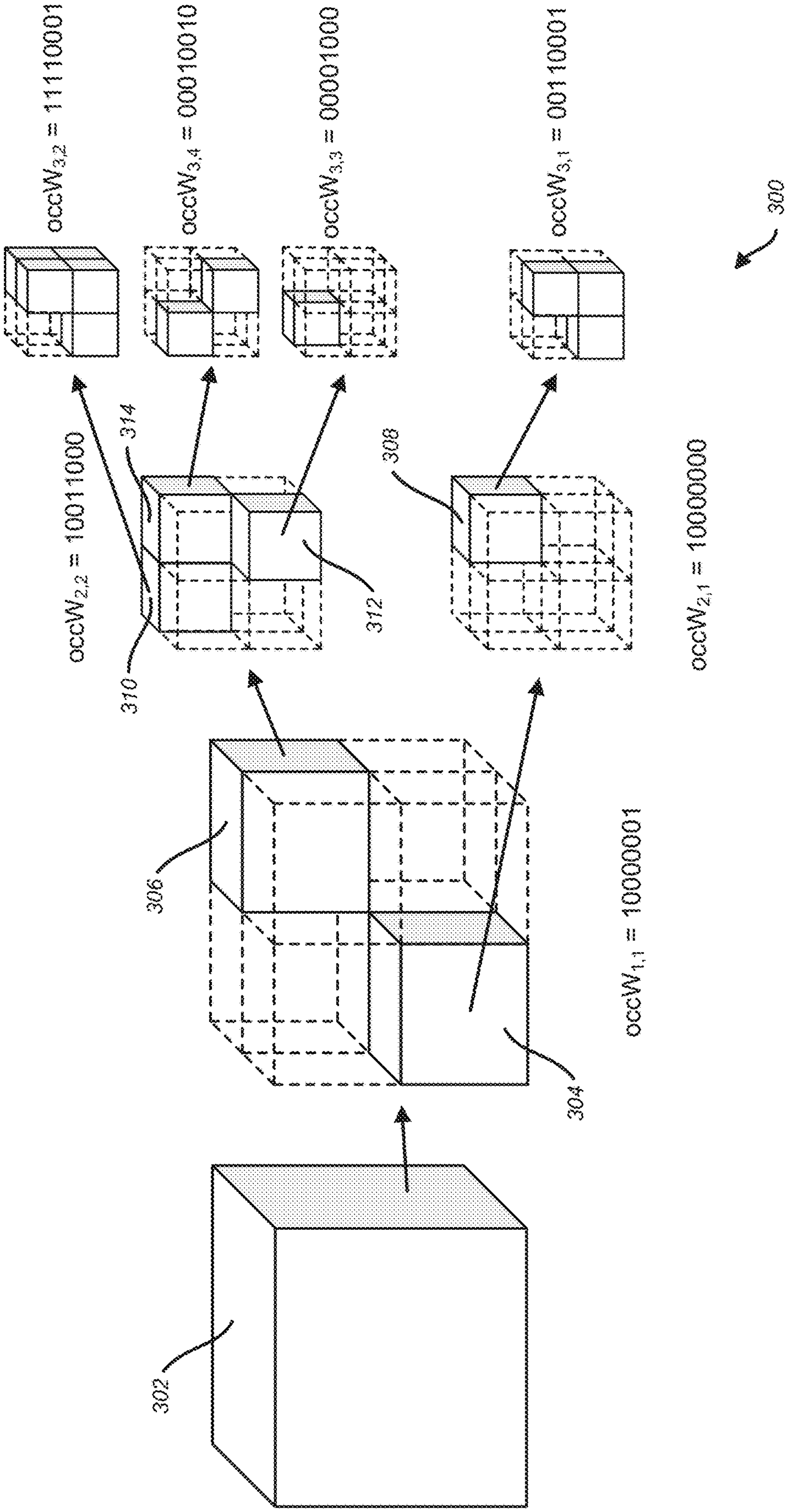
FIG. 3 shows an example scanning order.

FIG. 3 shows an example scanning order. FIG. 3 shows an example scanning order (e.g., breadth-first order as described herein) for an occupancy tree 300. More specifically, FIG. 3 shows a scanning order for the first three example levels of an occupancy tree 300. In FIG. 3, a cuboid (e.g., cube) 302 corresponding to a root node of the occupancy tree 300 may be divided into eight sub-cuboids (e.g., sub-cubes). Two sub-cuboids 304 and 306 of the eight sub-cuboids may be occupied. The other six sub-cuboids of the eight sub-cuboids may be unoccupied. Following the Morton order, a first eight-bit occupancy word (e.g., $occW_{1,1}$) may be constructed to represent the occupancy word of the root node. An (e.g., each) occupancy bit of the first eight-bit occupancy word (e.g., $occW_{1,1}$) may represent or indicate the occupancy of a sub-cube of the eight sub-cuboids in the Morton order. For example, the least significant occupancy bit of the first eight-bit occupancy word $occW_{1,1}$ may represent or indicate the occupancy of the first sub-cuboid of the eight sub-cuboids in the Morton order. The second least significant occupancy bit of the first eight-bit occupancy word $occW_{1,1}$ may represent or indicate the occupancy of the second sub-cuboid of the eight sub-cuboids in the Morton order, etc.

Each of occupied sub-cuboids (e.g., two occupied sub-cuboids 304 and 306) may correspond to a node off the root node in a second level of an occupancy tree 300. The occupied sub-cuboids (e.g., two occupied sub-cuboids 304 and 306) may be each further split into eight sub-cuboids. For example, one of the sub-cuboids 308 of the eight sub-cuboids split from the sub-cube 304 may be occupied, and the other seven sub-cuboids may be unoccupied. Three of the sub-cuboids 310, 312, and 314 of the eight sub-cuboids split from the sub-cube 306 may be occupied, and the other five sub-cuboids of the eight sub-cuboids split from the sub-cube 306 may be unoccupied. Two second eight-bit occupancy words $occW_{2,1}$ and $occW_{2,2}$ may be constructed in this order to respectively represent the occupancy word of the node corresponding to the sub-cuboid 304 and the occupancy word of the node corresponding to the sub-cuboid 306.

Each of occupied sub-cuboids (e.g., four occupied sub-cuboids 308, 310, 312, and 314) may correspond to a node in a third level of an occupancy tree 300. The occupied sub-cuboids (e.g., four occupied sub-cuboids 308, 310, 312, and 314) may be each further split into eight sub-cuboids or 32 sub-cuboids in total. For example, four third level eight-bit occupancy words $occW_{3,1}$, $occW_{3,2}$, $occW_{3,3}$ and $occW_{3,4}$ may be constructed in this order to respectively represent the occupancy word of the node corresponding to the sub-cuboid 308, the occupancy word of the node corresponding to the sub-cuboid 310, the occupancy word of the node corresponding to the sub-cuboid 312, and the occupancy word of the node corresponding to the sub-cuboid 314.

Occupancy words of an example occupancy tree 300 may be entropy coded (e.g., entropy encoded by an encoder and/or entropy decoded by a decoder), for example, following the scanning order discussed herein (e.g., Morton order). The occupancy words of the example occupancy tree 300 may be entropy coded (e.g., entropy encoded by an encoder and/or entropy decoded by a decoder) as the succession of the seven occupancy words $occW_{1,1}$ to $occW_{3,4}$, for example, following the scanning order discussed herein. The scanning order discussed herein may be a breadth-first scanning order. The occupancy word(s) of all node(s) having the same depth (or level) as a current parent node may have already been entropy coded, for example, if the occupancy word of a current child node belonging to the current parent node is being entropy coded. For example, the occupancy word(s) of all node(s) having the same depth (e.g., level) as the current child node and having a lower Morton order than the current child node may have also already been entropy coded. Part of the already coded occupancy word(s) may be used to entropy code the occupancy word of the current child node. The already coded occupancy word(s) of neighboring parent and child node(s) may be used, for example, to entropy code the occupancy word of the current child node. The occupancy bit(s) of the occupancy word having a lower Morton order than a particular occupancy bit may have also already been entropy coded and may be used to code the occupancy bit of the occupancy word of the current child node, for example, if the particular occupancy bit of the occupancy word of the current child node is being coded (e.g., entropy coded).

Figure 4:
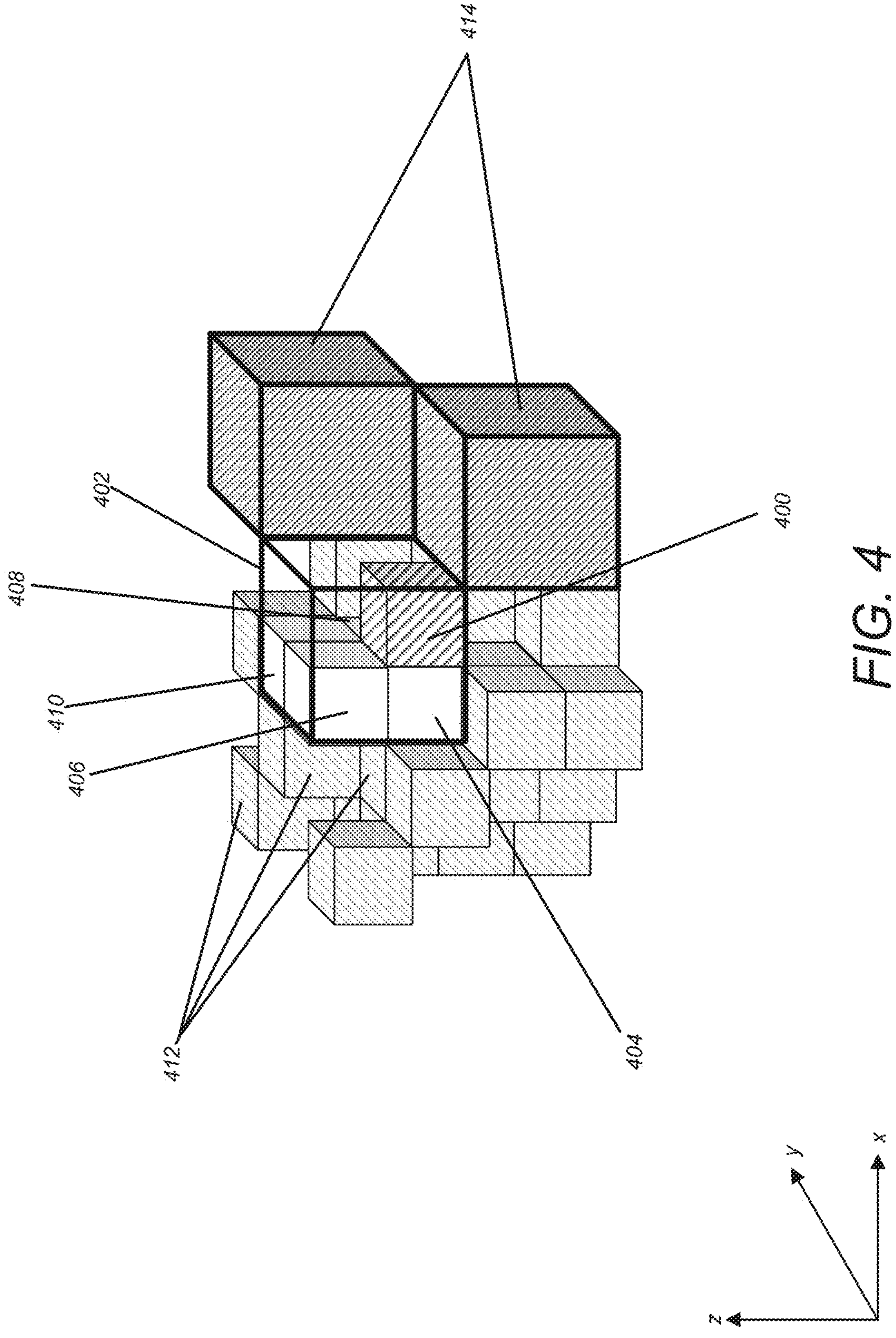
FIG. 4 shows an example neighborhood of cuboids.

FIG. 4 shows an example neighborhood of cuboids. FIG. 4 shows an example neighborhood of cuboids for coding (e.g., entropy coding) the occupancy of a child cuboid. More specifically, FIG. 4 shows an example neighborhood of cuboids with already-coded occupancies (e.g., occupancy bits). The neighborhood of cuboids with already-coded occupancy bits may be used to entropy code the occupancy bit of a current child cuboid 400. The neighborhood of cuboids with already-coded occupancy bits may be determined, for example, based on the scanning order of an occupancy tree representing the geometry of the cuboids in FIG. 4 as discussed herein. The neighborhood of cuboids, of a current child cuboid, may include one or more of: a cuboid adjacent to the current child cuboid, a cuboid sharing a vertex with the current child cuboid, a cuboid sharing an edge with the current child cuboid, a cuboid sharing a face with the current child cuboid, a parent cuboid adjacent to the current child cuboid, a parent cuboid sharing a vertex with the current child cuboid, a parent cuboid sharing an edge with the current child cuboid, a parent cuboid sharing a face with the current child cuboid, a parent cuboid adjacent to the current parent cuboid, a parent cuboid sharing a vertex with the current parent cuboid, a parent cuboid sharing an edge with the current parent cuboid, a parent cuboid sharing a face with the current parent cuboid, etc. As shown in FIG. 4, current child cuboid 400 may belong to a current parent cuboid 402. Following the scanning order of the occupancy words and occupancy bits of nodes of the occupancy tree, the occupancy bits of four child cuboids 404, 406, 408, and 410, belonging to the same current parent cuboid 402, may have already been coded. The occupancy bit of child cuboids 412 of preceding parent cuboids may have already been coded. The occupancy bits of parent cuboids 414, for which the occupancy bits of child cuboids have not already been coded, may have already been coded. The already-coded occupancy bits of cuboids 404, 406, 408, 410, 412, and 414 may be used to code the occupancy bit of the current child cuboid 400.

The number (e.g., quantity) of possible occupancy configurations (e.g., sets of one or more occupancy words and/or occupancy bits) for a neighborhood of a current child cuboid may be $2^N$, where N is the number (e.g., quantity) of cuboids in the neighborhood of the current child cuboid with already-coded occupancy bits. The neighborhood of the current child cuboid may comprise several dozens of cuboids. The neighborhood of the current child cuboid (e.g., several dozens of cuboids) may comprise 26 adjacent parent cuboids sharing a face, an, edge, and/or a vertex with the parent cuboid of the current child cuboid and also several adjacent child cuboids having occupancy bits already coded sharing a face, an edge, or a vertex with the current child cuboid. The occupancy configuration for a neighborhood of the current child cuboid may have billions of possible occupancy configurations, even limited to a subset of the adjacent cuboids, making its direct use impractical. An encoder and/or decoder may use the occupancy configuration for a neighborhood of the current child cuboid to select the context (e.g., a probability model), among a set of contexts, of a binary entropy coder (e.g., binary arithmetic coder) that may code the occupancy bit of the current child cuboid. The context-based binary entropy coding may be similar to the Context Adaptive Binary Arithmetic Coder (CABAC) used in MPEG-H Part 2 (also known as High Efficiency Video Coding (HEVC)).

An encoder and/or a decoder may use several methods to reduce the occupancy configurations for a neighborhood of a current child cuboid being coded to a practical number (e.g., quantity) of reduced occupancy configurations. The $2^6$ or 64 occupancy configurations of the six adjacent parent cuboids sharing a face with the parent cuboid of the current child cuboid may be reduced to 9 occupancy configurations. The occupancy configurations may be reduced by using geometry invariance. An occupancy score for the current child cuboid may be obtained from the $2^{26}$ occupancy configurations of the 26 adjacent parent cuboids. The score may be further reduced into a ternary occupancy prediction (e.g., "predicted occupied," "unsure", or "predicted unoccupied") by using score thresholds. The number (e.g., quantity) of occupied adjacent child cuboids and the number (e.g., quantity) of unoccupied adjacent child cuboids may be used instead of the individual occupancies of these child cuboids.

An encoder and/or a decoder using/employing one or more of the methods described herein may reduce the number (e.g., quantity) of possible occupancy configurations for a neighborhood of a current child cuboid to a more manageable number (e.g., a few thousands). It has been observed that instead of associating a reduced number (e.g., quantity) of contexts (e.g., probability models) directly to the reduced occupancy configurations, another mechanism may be used, namely Optimal Binary Coders with Update on the Fly (OBUF). An encoder and/or a decoder may implement OBUF to limit the number (e.g., quantity) of contexts to a lower number (e.g., 32 contexts).

OBUF may use a limited number (e.g., 32) of contexts (e.g., probability models). The number (e.g., quantity) of contexts in OBUF may be a fixed number (e.g., fixed quantity). The contexts used by OBUF may be ordered, referred to by a context index (e.g., a context index in the range of 0 to 31), and associated from a lowest virtual probability to a highest virtual probability to code a "1". A Look-Up Table (LUT) of context indices may be initialized at the beginning of a point cloud coding process. For example, the LUT may initially point to a context (e.g., with a context index 15) with the median virtual probability to code a "1" for all input. The LUT may initially point to a context with the median virtual probability to code a "1", among the limited number (e.g., quantity) of contexts, for all input. This LUT may take an occupancy configuration for a neighborhood of current child cuboid as input and output the context index associated with the occupancy configuration. The LUT may have as many entries as reduced occupancy configurations (e.g., around a few thousand entries). The coding of the occupancy bit of a current child cuboid may comprise steps including determining the reduced occupancy configuration of the current child node, obtaining a context index by using the reduced occupancy configuration as an entry to the LUT, coding the occupancy bit of the current child cuboid by using the context pointed to (or indicated) by the context index, and updating the LUT entry corresponding to the reduced occupancy configuration, for example, based on the value of the coded occupancy bit of the current child cuboid. The LUT entry may be decreased to a lower context index value, for example, if a binary "0" (e.g., indicating the current child cuboid is unoccupied) is coded. The LUT entry may be increased to a higher context index value, for example, if a binary "1" (e.g., indicating the current child cuboid is occupied) is coded. The update process of the context index may be, for example, based on a theoretical model of optimal distribution for virtual probabilities associated with the limited number (e.g., quantity) of contexts. This virtual probability may be fixed by a model and may be different from the internal probability of the context that may evolve, for example, if the coding of bits of data occurs. The evolution of the internal context may follow a well-known process similar to the process in CABAC.

An encoder and/or a decoder may implement a "dynamic OBUF" scheme. The "dynamic OBUF" scheme may enable an encoder and/or a decoder to handle a much larger number (e.g., quantity) of occupancy configurations for a neighborhood of a current child cuboid, for example, than general OBUF. The use of a larger number (e.g., quantity) of occupancy configurations for a neighborhood of a current child cuboid may lead to improved compression capabilities, and may maintain complexity within reasonable bounds. By using an occupancy tree compressed by OBUF, an encoder and/or a decoder may reach a lossless compression performance as good as 1 bit per point (bpp) for coding the geometry of dense point clouds. An encoder and/or a decoder may implement dynamic OBUF to potentially further reduce the bit rate by more than 25% to 0.7 bpp.

OBUF may not take as input a large variety of reduced occupancy configurations for a neighborhood of a current child cuboid, and may potentially cause a loss of useful correlation. With OBUF, the size of the LUT of context indices may be increased to handle more various occupancy configurations for a neighborhood of a current child cuboid as input. Due to such increase, statistics may be diluted, and compression performance may be worsened. For example, if the LUT has millions of entries and the point cloud has a hundred thousand points, then most of the entries may be never visited (e.g., looked up, accessed, etc.). Many entries may be visited only a few times and their associated context index may not be updated enough times to reflect any meaningful correlation between the occupancy configuration value and the probability of occupancy of the current child cuboid. Dynamic OBUF may be implemented to mitigate the dilution of statistics due to the increase of the number (e.g., quantity) of occupancy configurations for a neighborhood of a current child cuboid. This mitigation may be performed by a "dynamic reduction" of occupancy configurations in dynamic OBUF.

Dynamic OBUF may add an extra step of reduction of occupancy configurations for a neighborhood of a current child cuboid, for example, before using the LUT of context indices. This step may be called a dynamic reduction because it evolves, for example, based on the progress of the coding of the point cloud or, more precisely, based on already visited (e.g., looked up in the LUT) occupancy configurations.

As discussed herein, many possible occupancy configurations for a neighborhood of a current child cuboid may be potentially involved but only a subset may be visited if the coding of a point cloud occurs. This subset may characterize the type of the point cloud. For example, most of the visited occupancy configurations may exhibit occupied adjacent cuboids of a current child cuboid, for example, if AR or VR dense point clouds are being coded. On the other hand, most of the visited occupancy configurations may exhibit only a few occupied adjacent cuboids of a current child cuboid, for example, if sensor-acquired sparse point clouds are being coded. The role of the dynamic reduction may be to obtain a more precise correlation, for example, based on the most visited occupancy configuration while putting aside (e.g., reducing aggressively) other occupancy configurations that are much less visited. The dynamic reduction may be updated on-the-fly. The dynamic reduction may be updated on-the-fly, for example, after each visit (e.g., a lookup in the LUT) of an occupancy configuration, for example, if the coding of occupancy data occurs.

Figure 5:
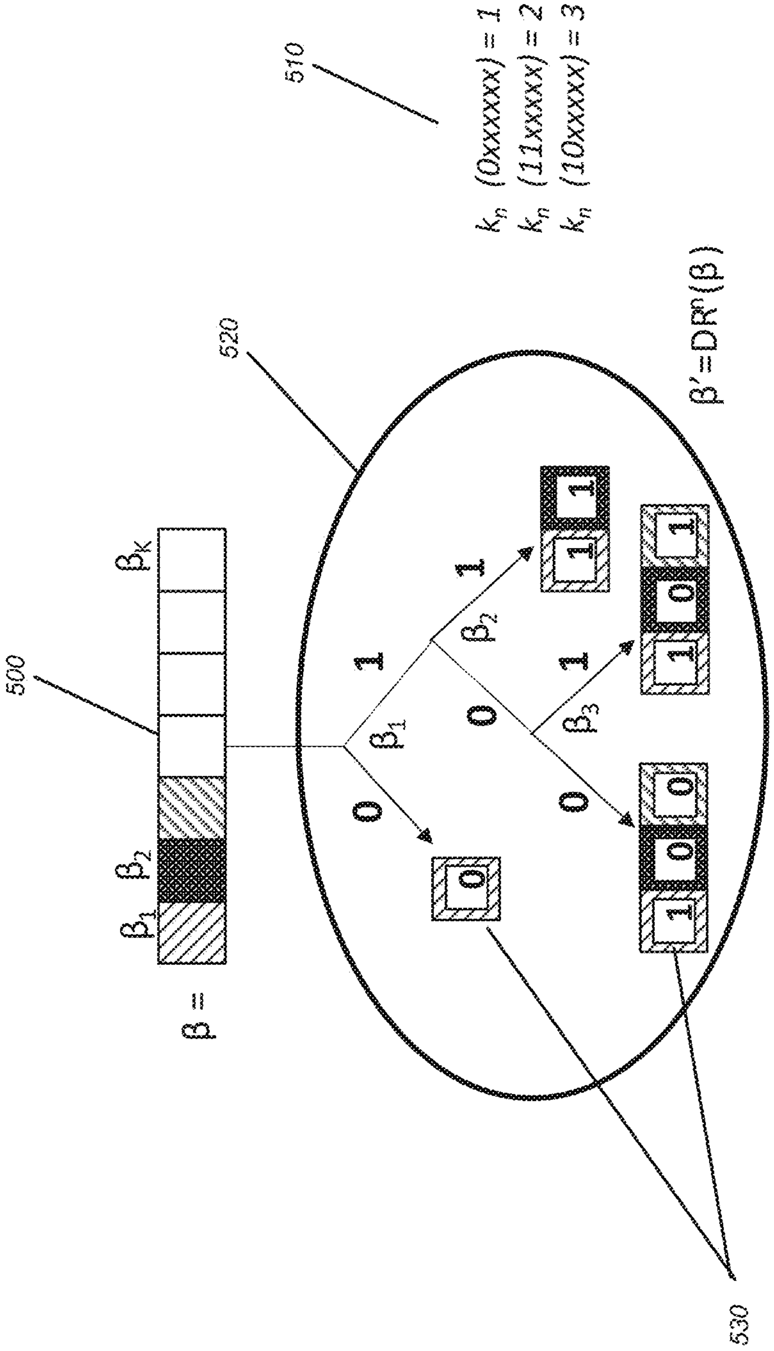
FIG. 5 shows an example of a dynamic reduction function that may be used in dynamic Optimal Binary Coders with Update on the Fly (OBUF).

FIG. 5 shows an example of a dynamic reduction function DR that may be used in dynamic OBUF. The dynamic reduction function DR may be obtained by masking bits $\beta_j$ of occupancy configurations 500

$$\beta = \beta_1 \ldots \beta_K$$

made of K bits. The size of the mask may decrease, for example, if occupancy configurations are visited (e.g., looked up in the LUT) a certain number (e.g., quantity) of times. The initial dynamic reduction function $DR^0$ may mask all bits for all occupancy configurations such that it is a constant function $DR^0(\beta)=0$ for all occupancy configurations $\beta$. The dynamic reduction function may evolve from a function $DR^n$ to an updated function $DR^{n+1}$. The dynamic reduction function may evolve from a function $DR^n$ to an updated function $DR^{n+1}$, for example, after each coding of an occupancy bit. The function may be defined by $$\beta' = DR^n(\beta) = \beta_1 \ldots \beta_{kn(\beta)}$$

where $k_n(\beta)$ 510 is the number (e.g., quantity) of non-masked bits. The initialization of $DR^0$ may correspond to $k_0(\beta)=0$, and the natural evolution of the reduction function toward finer statistics may lead to an increasing number (e.g., quantity) of non-masked bits $k_n(\beta) \le k_{n+1}(\beta)$. The dynamic reduction function may be entirely determined by the values of $k_n$ for all occupancy configurations $\beta$.

The visits (e.g., instances of a lookup in the LUT) to occupancy configurations may be tracked by a variable $NV(\beta')$ for all dynamically reduced occupancy configurations $\beta'=DR^n(\beta)$. The corresponding number (e.g., quantity) of visits $NV(\beta^{V'})$ may be increased by one, for example, after each instance of coding of an occupancy bit based on an occupancy configuration $\beta^V$. If this number (e.g., quantity) of visits $NV(\beta^{V'})$ is greater than a threshold $th_V$, $$NV(\beta^{V'}) > th_V$$

then the number (e.g., quantity) of unmasked bits $k_n(\beta)$ may be increased by one for all occupancy configurations $\beta$ being dynamically reduced to $\beta^{V'}$. This corresponds to replacing the dynamically reduced occupancy configuration $\beta^{V'}$ by the two new dynamically reduced occupancy configurations $\beta^{0'}$ and $\beta^{1'}$ defined by $$\beta^{0'} = \beta^{V'}0 = \beta_1^V \ldots \beta_{kn(\beta)}^V 0 \text{ and } \beta^{1'} = \beta^{V'}1 = \beta_1^V \ldots \beta_{kn(\beta)}^V 1.$$

In other words, the number (e.g., quantity) of unmasked bits has been increased by one $k_{n+1}(\beta)=k_n(\beta)+1$ for all occupancy configurations $\beta$ such that $DR^n(\beta)=\beta^{V'}$. The number (e.g., quantity) of visits of the two new dynamically reduced occupancy configurations may be initialized to zero $$NV(\beta^{0\prime}) = NV(\beta^{1\prime}) = 0. \tag{I}$$

At the start of the coding, the initial number (e.g., quantity) of visits for the initial dynamic reduction function $DR^0$ may be set to $$NV(DR^0(\beta)) = NV(0) = 0,$$

and the evolution of NV on dynamically reduced occupancy configurations may be entirely defined.

The corresponding LUT entry LUT[$\beta^{V\prime}$] may be replaced by the two new entries LUT[$\beta^{0\prime}$] and LUT[$\beta^{1\prime}$] that are initialized by the coder index associated with $\beta^{V\prime}$. The corresponding LUT entry LUT[$\beta^{V\prime}$] may be replaced by the two new entries LUT[$\beta^{0\prime}$] and LUT[$\beta^{1\prime}$] that are initialized by the coder index associated with $\beta^{V\prime}$, for example, if a dynamically reduced occupancy configuration $\beta^{V\prime}$ is replaced by the two new dynamically reduced occupancy configurations $\beta^{0\prime}$ and $\beta^{1\prime}$, $$LUT[\beta^{0\prime}] = LUT[\beta^{1\prime}] = LUT[\beta^{V\prime}], \tag{II}$$

and then evolve separately. The evolution of the LUT of coder indices on dynamically reduced occupancy configurations may be entirely defined.

The reduction function $DR^n$ may be modeled by a series of growing binary trees $T^n$ 520 whose leaf nodes 530 are the reduced occupancy configurations $\beta'=DR^n(\beta)$. The initial tree may be the single root node associated with $0=DR^0(\beta)$. The replacement of the dynamically reduced to $\beta^{V\prime}$ by $\beta^{0\prime}$ and $\beta^{1\prime}$ may correspond to growing the tree $T^n$ from the leaf node associated with $\beta^{V\prime}$, for example, by attaching to it two new nodes associated with $\beta^{0\prime}$ and $\beta^{1\prime}$. The tree $T^{n+1}$ may be obtained by this growth. The number (e.g., quantity) of visits NV and the LUT of context indices may be defined on the leaf nodes and evolve with the growth of the tree through equations (I) and (II).

The practical implementation of dynamic OBUF may be made by the storage of the array NV[$\beta'$] and the LUT[$\beta'$] of context indices, as well as the trees $T^n$ 520. An alternative to the storage of the trees may be to store the array $k_n[\beta]$ 510 of the number (e.g., quantity) of non-masked bits.

A limitation for implementing dynamic OBUF may be its memory footprint. In some applications, a few million occupancy configurations may be practically handled, leading to about 20 bits $\beta_i$ constituting an entry configuration $\beta$ to the reduction function DR. Each bit $\beta_i$ may correspond to the occupancy status of a neighboring cuboid of a current child cuboid or a set of neighboring cuboids of a current child cuboid.

Higher (e.g., more significant) bits $\beta_i$ (e.g., $\beta_0$, $\beta_1$, etc.) may be the first bits to be unmasked. Higher (e.g., more significant) bits $\beta_i$ (e.g., $\beta_0$, $\beta_1$, etc.) may be the first bits to be unmasked, for example, during the evolution of the dynamic reduction function DR. The order of neighbor-based information put in the bits $\beta_i$ may impact the compression performance. Neighboring information may be ordered from higher (e.g., highest) priority to lower priority and put in this order into the bits $\beta_i$, from higher to lower weight. The priority may be, from the most important to the least important, occupancy of sets of adjacent neighboring child cuboids, then occupancy of adjacent neighboring child cuboids, then occupancy of adjacent neighboring parent cuboids, then occupancy of non-adjacent neighboring child nodes, and finally occupancy of non-adjacent neighboring parent nodes. Adjacent nodes sharing a face with the current child node may also have higher priority than adjacent nodes sharing an edge (but not sharing a face) with the current child node. Adjacent nodes sharing an edge with the current child node may have higher priority than adjacent nodes sharing only a vertex with the current child node.

Figure 6:
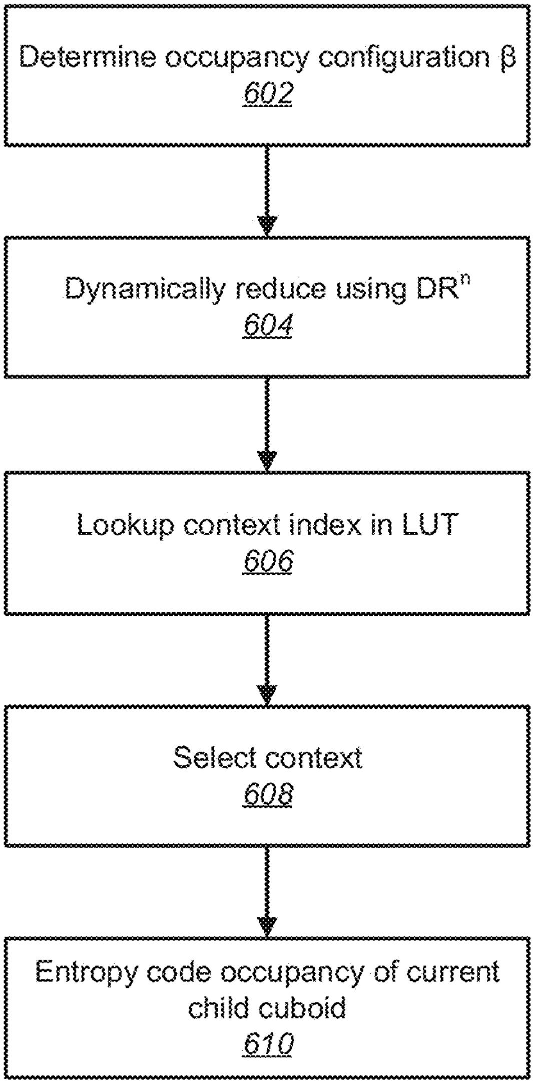
FIG. 6 shows an example method for coding occupancy of a cuboid using dynamic OBUF.

FIG. 6 shows an example method for coding occupancy of a cuboid using dynamic OBUF. More specifically, FIG. 6 shows an example method for coding occupancy bit of a current child cuboid using dynamic OBUF. One or more steps of FIG. 6 may be performed by an encoder and/or a decoder (e.g., the encoder 114 and/or decoder 120 in FIG. 1). All or portions of the flowchart may be implemented by a coder (e.g., the encoder 114 and/or decoder 120 in FIG. 1), an example computer system 1900 in FIG. 19, and/or an example computing device 2030 in FIG. 20.

At step 602, an occupancy configuration (e.g., occupancy configuration $\beta$) of the current child cuboid may be determined. The occupancy configuration (e.g., occupancy configuration $\beta$) of the current child cuboid may be determined, for example, based on occupancy bits of already-coded cuboids in a neighborhood of the current child cuboid. At step 604, the occupancy configuration (e.g., occupancy configuration $\beta$) may be dynamically reduced. The occupancy configuration may be dynamically reduced, for example, using a dynamic reduction function $DR^n$. For example, the occupancy configuration $\beta$ may be dynamically reduced into a reduced occupancy configuration $\beta'=DR^n(\beta)$. At step 606, context index may be looked up, for example, in a look-up table (LUT). For example, the encoder and/or decoder may look up context index LUT[$\beta'$] in the LUT of the dynamic OBUF. At step 608, context (e.g., probability model) may be selected. For example, the context (e.g., probability model) pointed to by the context index may be selected. At step 610, occupancy of the current child cuboid may be entropy coded. For example, the occupancy bit of the current child cuboid may be entropy coded (e.g., arithmetic coded), for example, based on the context. The occupancy bit of the current child cuboid may be coded based on the occupancy bits of the already-coded cuboids neighboring the current child cuboid.

Although not shown in FIG. 6, the encoder and/or decoder may update the reduction function and/or update the context index. For example, the encoder and/or decoder may update the reduction function $DR^n$ into $DR^{n+1}$ and/or update the context index LUT[$\beta'$], for example, based on the occupancy bit of the current child cuboid. The method of FIG. 6 may be repeated for additional or all child cuboids of parent cuboids corresponding to nodes of the occupancy tree in a scan order, such as the scan order discussed herein with respect to FIG. 3.

In general, the occupancy tree is a lossless compression technique. The occupancy tree may be adapted to provide lossy compression, for example, by modifying the point cloud on the encoder side (e.g., down-sampling, removing points, moving points, etc.). The performance of the lossy compression may be weak. The lossy compression may be a useful lossless compression technique for dense point clouds.

One approach to lossy compression for point cloud geometry may be to set the maximum depth of the occupancy tree to not reach the smallest volume size of one voxel but instead to stop at a bigger volume size (e.g., N×N×N cuboids (e.g., cubes), where N>1). The geometry of the points belonging to each occupied leaf node associated with the bigger volumes may then be modeled. This approach may be particularly suited for dense and smooth point clouds that may be locally modeled by smooth functions such as planes or polynomials. The coding cost may become the cost of the occupancy tree plus the cost of the local model in each of the occupied leaf nodes.

A scheme for modeling the geometry of the points belonging to each occupied leaf node associated with a volume size larger than one voxel may use sets of triangles as local models. The scheme may be referred to as the "TriSoup" scheme. TriSoup is short for "Triangle Soup" because the connectivity between triangles may not be part of the models. An occupied leaf node of an occupancy tree that corresponds to a cuboid with a volume greater than one voxel may be referred to as a TriSoup node. An edge belonging to at least one cuboid corresponding to a TriSoup node may be referred to as a TriSoup edge. A TriSoup node may comprise a presence flag ($s_k$) for each TriSoup edge of its corresponding occupied cuboid. A presence flag ($s_k$) of a TriSoup edge may indicate whether a TriSoup vertex ($V_k$) is present or not on the TriSoup edge. At most one TriSoup vertex ($V_k$) may be present on a TriSoup edge. For each vertex ($V_k$) present on a TriSoup edge of an occupied cuboid, the TriSoup node corresponding to the occupied cuboid may comprise a position ($p_k$) of the vertex ($V_k$) along the TriSoup edge.

In addition to the occupancy words of an occupancy tree, an encoder may entropy encode, for each TriSoup node of the occupancy tree, the TriSoup vertex presence flags and positions of each TriSoup edge belonging to TriSoup nodes of the occupancy tree. A decoder may similarly entropy decode the TriSoup vertex presence flags and positions of each TriSoup edge and vertex along a respective TriSoup edge belonging to a TriSoup node of the occupancy tree, in addition to the occupancy words of the occupancy tree.

Figure 7:
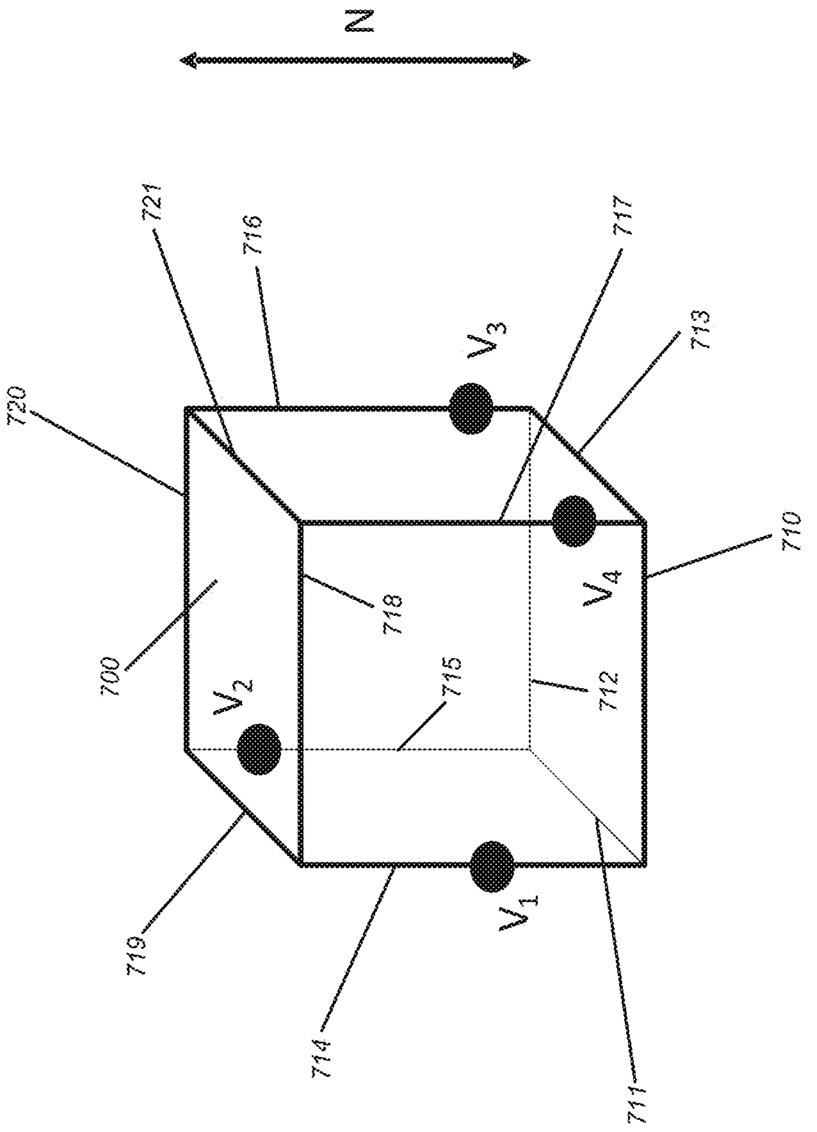
FIG. 7 shows an example of an occupied cuboid.

FIG. 7 shows an example of an occupied cuboid (e.g., cube) 700. More specifically, FIG. 7 shows an example of an occupied cuboid (e.g., cube) 700 of size N×N×N (where N>1) that corresponds to a TriSoup node of an occupancy tree. An occupied cuboid 700 may comprise edges (e.g., TriSoup edges 710-721). The TriSoup node, corresponding to the occupied cuboid 700, may comprise a presence flag ($s_k$) for each edge (e.g., each TriSoup edge of the TriSoup edges 710-721). For example, the presence flag of a TriSoup edge 714 may indicate that a TriSoup vertex $V_1$ is present on the TriSoup edge 714. The presence flag of a TriSoup edge 715 may indicate that a TriSoup vertex $V_2$ is present on the TriSoup edge 715. The presence flag of a TriSoup edge 716 may indicate that a TriSoup vertex $V_3$ is present on the TriSoup edge 716. The presence flag of a TriSoup edge 717 may indicate that a TriSoup vertex $V_4$ is present on the TriSoup edge 717. The presence flags of the remaining TriSoup edges each may indicate that a TriSoup vertex is not present on their corresponding TriSoup edge. The TriSoup node, corresponding to the occupied cuboid 700, may comprise a position for each TriSoup vertex present along one of its TriSoup edges 710-721. More specifically, the TriSoup node, corresponding to the occupied cuboid 700, may comprise a position $p_1$ for TriSoup vertex $V_1$, a position $p_2$ for TriSoup vertex $V_2$, a position $p_3$ for TriSoup vertex $V_3$, and a position $p_4$ for TriSoup vertex $V_4$. The TriSoup vertices may be shared among TriSoup nodes along common TriSoup edge(s).

A presence flag ($s_k$) and, if the presence flag ($s_k$) may indicate the presence of a vertex, a position ($p_k$) of a current TriSoup edge may be entropy coded. The presence flag ($s_k$) and position ($p_k$) may be individually or collectively referred to as vertex information or TriSoup vertex information. A presence flag ($s_k$) and, if the presence flag ($s_k$) indicates the presence of a vertex, a position ($p_k$) of a current TriSoup edge may be entropy coded, for example, based on already-coded presence flags and positions, of present TriSoup vertices, of TriSoup edges that neighbor the current TriSoup edge. A presence flag ($s_k$) and, if the presence flag ($s_k$) may indicate the presence of a vertex, a position ($p_k$) of a current TriSoup edge (e.g., indicating a position of the vertex the edge is along) may be additionally or alternatively entropy coded. The presence flag ($s_k$) and the position ($p_k$) of a current TriSoup edge may be additionally or alternatively entropy coded, for example, based on occupancies of cuboids that neighbor the current TriSoup edge. Similar to the entropy coding of the occupancy bits of the occupancy tree, a configuration $\beta_{TS}$ for a neighborhood (also referred to as a neighborhood configuration $\beta_{TS}$) of a current TriSoup edge may be obtained and dynamically reduced into a reduced configuration $\beta_{TS}'=DR^n(\beta_{TS})$, for example, by using a dynamic OBUF scheme for TriSoup. A context index $LUT[\beta_{TS}']$ may be obtained from the OBUF LUT. At least a part of the vertex information of the current TriSoup edge may be entropy coded using the context (e.g., probability model) pointed to by the context index.

The TriSoup vertex position ($p_k$) (if present) along its TriSoup edge may be binarized. The TriSoup vertex position ($p_k$) (if present) along its TriSoup edge may be binarized, for example, to use a binary entropy coder to entropy code at least part of the vertex information of the current TriSoup edge. A number (e.g., quantity) of bits $N_b$ may be set for the quantization of the TriSoup vertex position ($p_k$) along the TriSoup edge of length N. The TriSoup edge of length N may be uniformly divided into $2^{Nb}$ quantization intervals. By doing so, the TriSoup vertex position ($p_k$) may be represented by $N_b$ bits ($p_k^j$, j=1, . . . , $N_b$) that may be individually coded by the dynamic OBUF scheme as well as the bit corresponding to the presence flag ($s_k$). The neighborhood configuration $\beta_{TS}$, the OBUF reduction function $DR^n$, and the context index may depend on the nature, characteristic, and/or property of the coded bit (e.g., a presence flag ($s_k$), a highest position bit ($p_{k1}$), a second highest position bit ($p_{k2}$), etc.) of the coded bit (e.g., presence flag ($s_k$), highest position bit ($p_k^1$), second highest position bit ($p_k^2$), etc.). There may practically be several dynamic OBUF schemes, each dedicated to a specific bit of information (e.g., presence flag ($s_k$) or position bit ($p_k^j$)) of the vertex information.

Figure 8A:
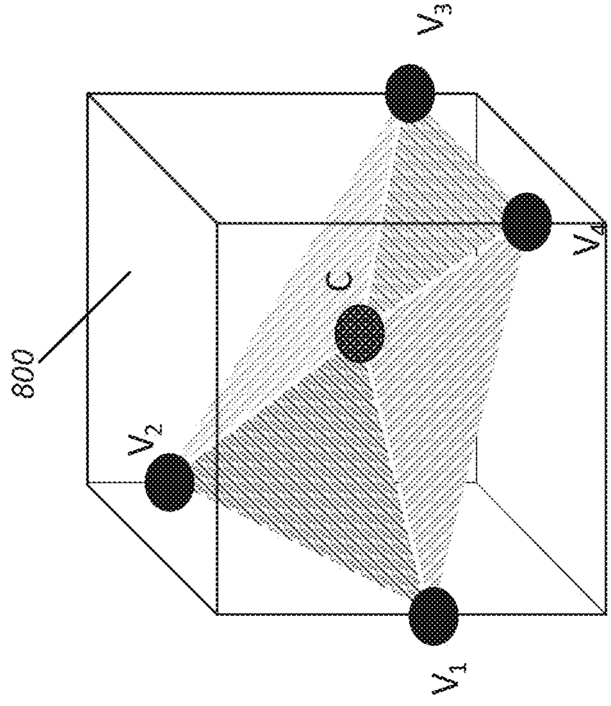
FIG. 8A shows an example cuboid corresponding to a TriSoup node.

FIG. 8A shows an example cuboid (e.g., cube) 800 corresponding to a TriSoup node. A cuboid 800 may correspond to a TriSoup node with a number K of TriSoup vertices $V_k$. Within cuboid 800, TriSoup triangles may be constructed from the TriSoup vertices $V_k$. TriSoup triangles may be constructed from the TriSoup vertices $V_k$, for example, if at least three (K≥3) TriSoup vertices are present on the TriSoup edges of cuboid 800. For example, with respect to FIG. 8A, four TriSoup vertices may be present and TriSoup triangles may be constructed. The TriSoup triangles may be constructed around the centroid vertex C defined as the mean of the TriSoup vertices $V_k$. A dominant direction may be determined, then vertices $V_k$ may be ordered by turning around this direction, and the following K TriSoup triangles may be constructed: $V_1V_2C$, $V_2V_3C$, . . . , $V_KV_1C$. The dominant direction may be chosen among the three directions respectively parallel to the axes of the 3D space to increase or maximize the 2D surface of the triangles, for example, if the triangles are projected along the dominant direction. By doing so, the dominant direction may be somewhat perpendicular to a local surface defined by the points of the point cloud belonging to the TriSoup node.

Figure 8B:
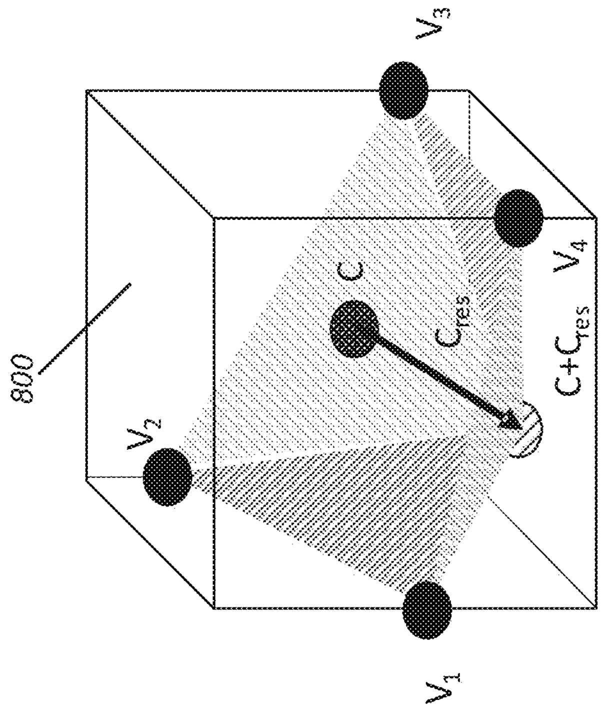
FIG. 8B shows an example refinement to the TriSoup model.

FIG. 8B shows an example refinement to the TriSoup model. The TriSoup model may be refined by coding a centroid residual value. A centroid residual value $C_{res}$ may be coded into the bitstream. A centroid residual value $C_{res}$ may be coded into the bitstream, for example, to use $C+C_{res}$ instead of C as a pivoting vertex for the triangles (e.g., for constructing/generating the triangles). By using $C+C_{res}$ as the pivoting vertex for the triangles, the vertex $C+C_{res}$ may be closer to the points of the point cloud than the centroid C (e.g., the centroid C used to model the points). The reconstruction error may be lowered, leading to lower distortion at the cost of a small increase in bitrate needed for coding $C_{res}$.

Figure 9:
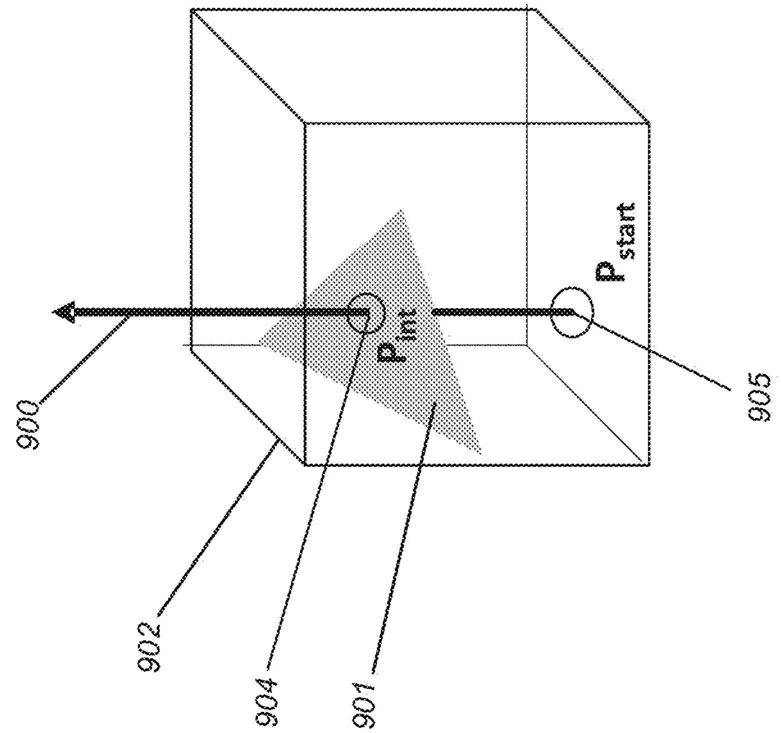
FIG. 9 shows an example of voxelization.

FIG. 9 shows an example of voxelization. More specifically, FIG. 9 shows an example of voxelization using ray tracing. Voxelization may refer to reconstruction of a decoded point cloud from a set of TriSoup triangles. Voxelization may be performed by ray tracing for each triangle individually. Voxelization may be performed by ray tracing for each triangle individually, for example, before removing duplicated points between voxelized triangles. As shown in FIG. 9, rays 900 may be launched parallel to one of the three axes of the 3D space. Rays 900 may be launched starting from integral (or integer) coordinates $P_{start}$ 905 (e.g., an origin point). The intersection $P_{int}$ 904 (e.g., an intersection point), if any, of the rays 900 with a TriSoup triangle 901 belonging to a cuboid (e.g., cube) 902 corresponding to a TriSoup node may be rounded (or quantized) to obtain a decoded point. The decoded point may correspond to a voxel. This intersection $P_{int}$ may be determined (e.g., found), for example, by using a ray tracing or ray casting method. For example, this intersection $P_{int}$ may be determined using the Möller-Trumbore algorithm. Voxelization may be performed by rasterization for each triangle individually. Voxelization may be performed by rasterization for each triangle individually, for example, before removing duplicated points (e.g., voxels) from voxelized triangles. Rasterization may take geometric shapes and convert them into a raster image (e.g., pixel-based image).

TriSoup vertices of TriSoup nodes may need to be quantized to certain, acceptable vertex positions, for example, to ensure continuity of a triangle-based modeling between TriSoup nodes. As a result, Tri-Soup modeling that approximates occupied voxels within a TriSoup node may not match occupied voxels determined to be within a TriSoup triangle with quantized TriSoup vertices. Some voxels may be missed, for example, if voxelizing of the TriSoup triangle occurs (e.g., if voxelizing the TriSoup triangle with quantized vertices). Missing some voxels may result in visual artifacts if rendered for display.

Figure 10B:
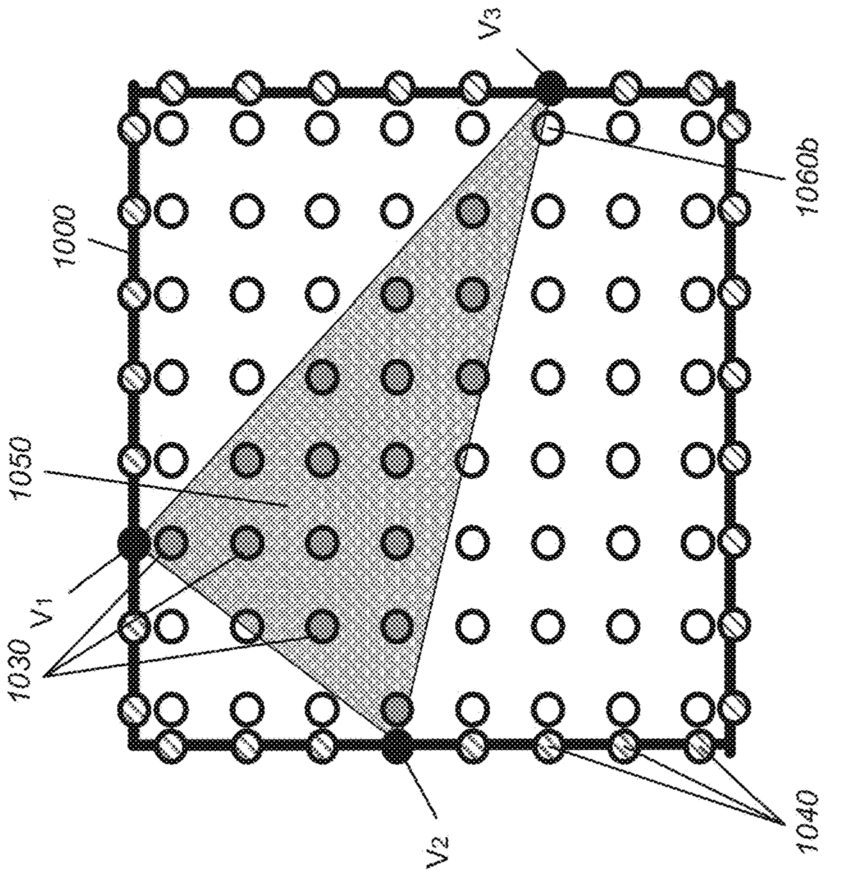
FIG. 10A and FIG. 10B show an example of approximating a TriSoup triangle of occupied voxels.
Figure 10A:
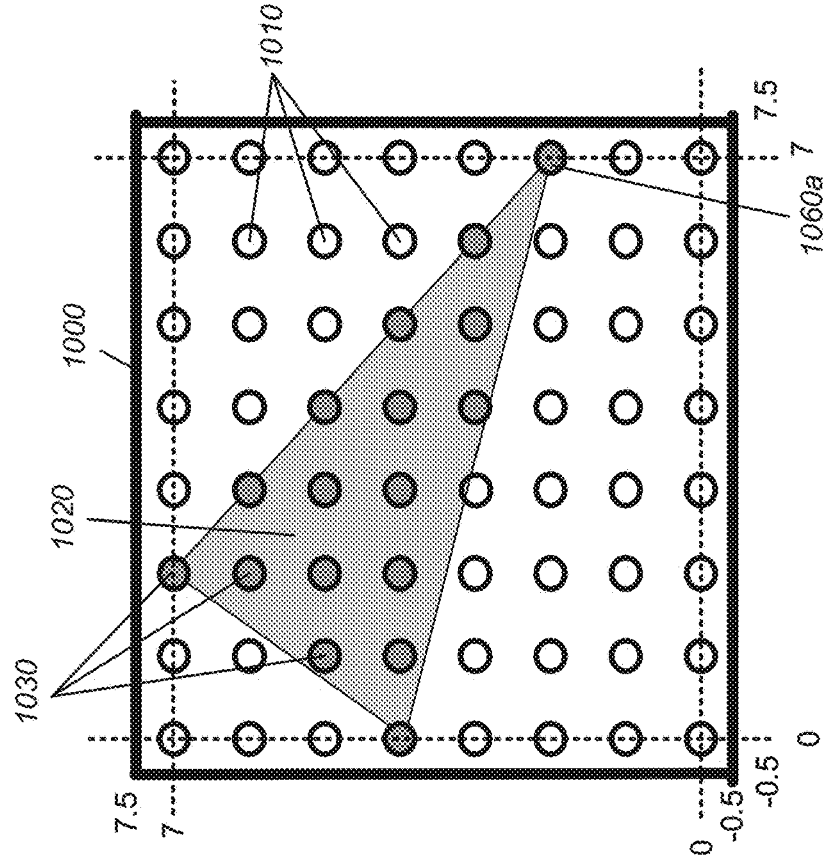

FIG. 10A and FIG. 10B show an example of approximating a TriSoup triangle of occupied voxels. More specifically, FIG. 10A shows an example of approximating a triangle 1020 (e.g., TriSoup triangle) of occupied voxels 1030, in a cuboid corresponding to a TriSoup node, using a TriSoup method. For ease of illustration, boundary 1000 of the cuboid associated with the TriSoup node may be depicted in two dimensions (2D) and may show a size of 8×8 (or any other size). The cuboid (and associated TriSoup node) may have a size of, for example, 8×8×8 (represented as 8×8 as shown in FIG. 10A). The cuboid (and associated TriSoup node) may encompass points or voxels (e.g., voxels 1010). Of these points or voxels (e.g., voxels 1010), the integral coordinates may be, for example, between 0 and 7. By construction of TriSoup nodes, the boundary 1000 of TriSoup nodes may be located between voxels. For example, the boundary 1000 of TriSoup nodes may be located at coordinates −0.5 and 7.5. The TriSoup method described herein may approximate occupied voxels 1030 of the point cloud. For example, the TriSoup method described herein may approximate occupied voxels 1030 of the point cloud by at least one triangle 1020.

FIG. 10B shows an example of a triangle 1050 (e.g., TriSoup triangle) determined for the cuboid of FIG. 10A. As explained herein, the approximated triangle 1020 of FIG. 10A may be modeled by the triangle 1050. The approximated triangle 1020 of FIG. 10A may be modeled by the triangle 1050, for example, to ensure continuity of the triangle-based modeling between TriSoup nodes. Of the triangle 1050, at least one vertex $V_1$, $V_2$, or $V_3$ may belong to (e.g. be located on) boundary 1000 of the cuboid. Vertices $V_i$ of triangle 1050 on node boundary 1000 may be quantized to certain acceptable vertex positions 1040 along edges of the cuboid. For example, vertices $V_i$ of triangle 1050 on node boundary 1000 may be quantized to certain acceptable vertex positions 1040 along edges of the cuboid, depending on a quantization function. Modeling triangle 1050 may lead to some missed voxels such as voxel 1060*b* (which was present and shown as voxel 1060*a* in FIG. 10A) that may not be recovered, for example, if voxelizing triangle 1050. For example, voxel 1060*b* may not be determined by the intersection of a ray with triangle 1050 but correspond nevertheless to a point of the original point cloud.

The voxelization process may use ray tracing or rasterization. The voxelization process may use, for example, ray-triangle intersection algorithms such as the Möller-Trumbore algorithm. The ray-triangle intersection algorithms such as the Möller-Trumbore algorithm may rely on launching rays to determine whether rays intersect with TriSoup triangles and if so, at what points of the TriSoup triangles. Rays may be launched from integral coordinates that correspond to the centers of voxels. For example, a ray, launched parallel to a coordinate axis in 3D space, may intersect a TriSoup triangle if and only if the projection, along the ray direction, of the center of a voxel belongs to the TriSoup triangle. In other words, the ray may be determined to intersect the TriSoup triangle if the point of intersection corresponds to the center of the voxel. Launched rays may miss voxels. These voxels may significantly intersect the TriSoup triangle in the 3D space, but their centers do not intersect the TriSoup triangles, as shown in FIG. 10B (e.g., voxel 1060*b*).

In at least some technologies, techniques such as the halo technique have been introduced to enhance the voxelization process. For example, techniques such as the halo technique may improve voxel reconnection between triangles. The halo technique may seek to increase intersection between launched rays and triangles to recapture the missed voxels resulting from quantizing the TriSoup triangles' vertices. The halo technique may be based on the Möller-Trumbore algorithm that may be used to voxelize a TriSoup triangle by ray tracing. The Möller-Trumbore algorithm is based on generating, for example, with respect to a triangle, barycentric coordinates of points of intersection between rays and a plane of the triangle. Points of the triangle may be determined, for example, based on the barycentric coordinates.

Figure 11:
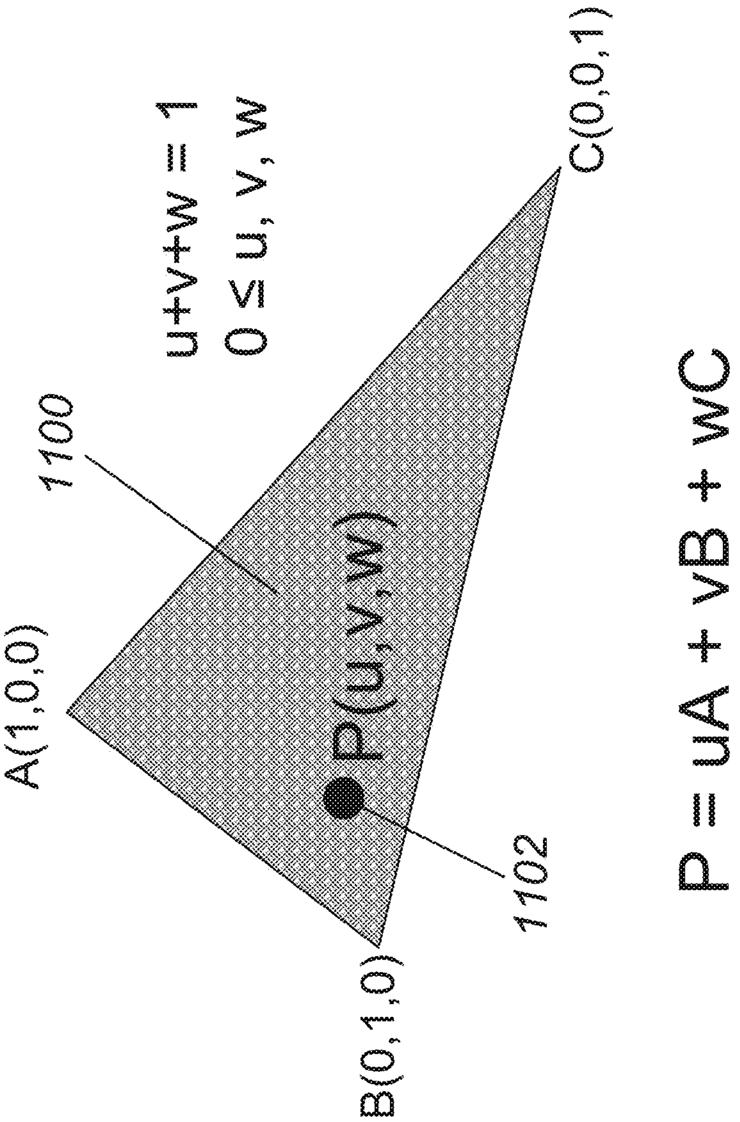
FIG. 11 shows an example of barycentric coordinates of an intersection relative to a TriSoup triangle.

FIG. 11 shows an example of barycentric coordinates of an intersection (e.g., an intersection point) relative to a TriSoup triangle. More specifically, FIG. 11 shows an example of barycentric coordinates (u, v, w) of a point 1102 (P) relative to a TriSoup triangle 1100. The TriSoup triangle 1100 may comprise vertices labeled A, B, and C in the 3D space. Point 1102 may be determined as an intersection between a ray and a plane of TriSoup triangle 1100. The plane of TriSoup triangle 1100 may contain or pass through the three vertices A, B, and C of TriSoup triangle 1100. The ray may be launched parallel to one of the three coordinate axes in 3D space. This intersection (e.g., point) 1102 may be uniquely represented as a sum of the three vertices of TriSoup triangle 1100:

$$P = uA + vB + wC$$

under the condition that u+v+w=1. Any point P of the plane (of TriSoup triangle 1100) has unique coordinates (u,v,w) in the barycentric coordinate system. A point with barycentric coordinates (u,v,w) includes an ordered triple of numbers u, v, and w. A point with barycentric coordinates (u,v,w) that sum to 1 (i.e., u+v+w=1) is known as homogeneous barycentric coordinates or normalized barycentric coordinates. The barycentric coordinates of the intersection point with respect to TriSoup triangle 1100 may be determined using, for example, the Möller-Trumbore algorithm.

The three vertices A, B, C of TriSoup triangle 1100 may have respective barycentric coordinates A(1,0,0), B(0,1,0) and C(0,0,1). These barycentric coordinates may be obtained, for example, by converting points with Cartesian coordinates in 3D space to homogeneous barycentric coordinates. The convex hull (i.e., TriSoup triangle 1100) of the three vertices A, B, and C is equal to the set of all points such that the barycentric coordinates u, v, and w is each greater than or equal to zero:

$$0 \le u, v, w$$

The intersection point may be determined to belong to TriSoup triangle 1100. The intersection point may be determined to belong to TriSoup triangle 1100, for example, based on the intersection point having barycentric coordinates with an ordered triple of values that is each greater than or equal to zero (0). The intersection point may be determined to not belong to TriSoup triangle. The intersection point may be determined to not belong to TriSoup triangle, for example, if at least one of barycentric coordinates (i.e., one of u, v, or w) is negative or less than zero (0). A point determined to belong to TriSoup triangle 1100 may, for example, be on the ray intersecting TriSoup triangle 1100. A point determined to belong to TriSoup triangle 1100 may, for example, be on an edge of TriSoup triangle 1100.

Figure 12:
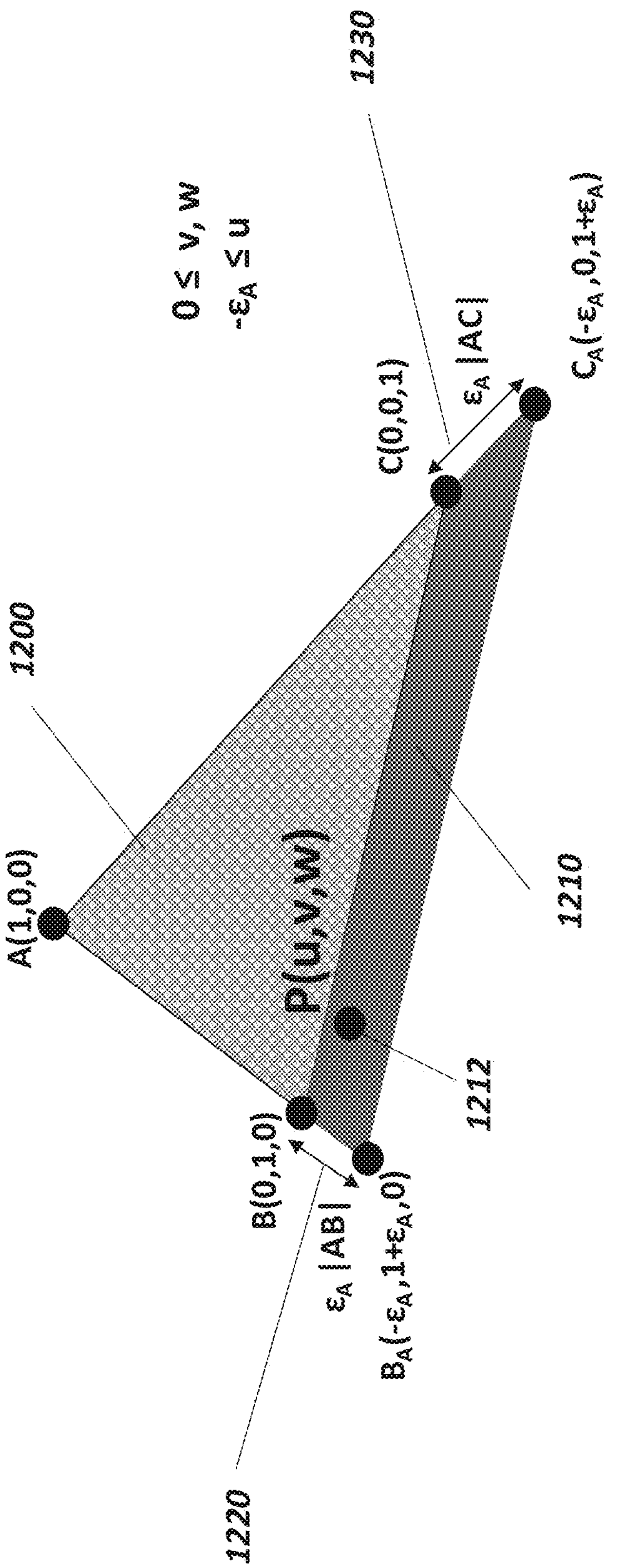
FIG. 12 shows an example of a halo method.

FIG. 12 shows an example of a halo method. More specifically, FIG. 12 shows an example of the halo technique in which one or more inequalities of barycentric coordinates u, v, and w may be relaxed to generate a "halo" extending from one or more edges of a triangle 1200 (e.g., a TriSoup triangle). A halo may be added along and extending from at least one edge of a triangle. A halo may be added, for example, by relaxing one or more inequalities of barycentric coordinates into one or more less constraining inequalities. A halo may allow (or permit) one or more points within the halo and outside of the triangle to be determined or identified. For example, as shown in FIG. 12, relaxing the inequality 0≤u into a less constraining inequality $-\varepsilon_A \le u$, for a fixed positive halo parameter $\varepsilon_A$, may add a halo 1210 along and extending from the edge BC of triangle 1200. The halo 1210 may permit one or more points (e.g., point 1212) within halo 1210 and outside of triangle 1200 to be determined or identified. The union of triangle 1200 and halo 1210 may result in a new triangle with vertices A, $B_A$, $C_A$. The two halo vertices $B_A$ and $C_A$ may have barycentric coordinates $B_A(-\varepsilon_A, 1+\varepsilon_A, 0)$ and $C_A(-\varepsilon_A, 0, 1+\varepsilon_A)$ with respect to triangle 1200. For example, the width 1220 of the halo 1210 may be equal to $\varepsilon_A|AB|$ along the edges AB. |AB| may stand for the length of edge AB. The width 1230 of halo 1210 may be equal to $\varepsilon_A|AC|$ along the edge AC. |AC| may stand for the length of edge AC.

Figure 13:
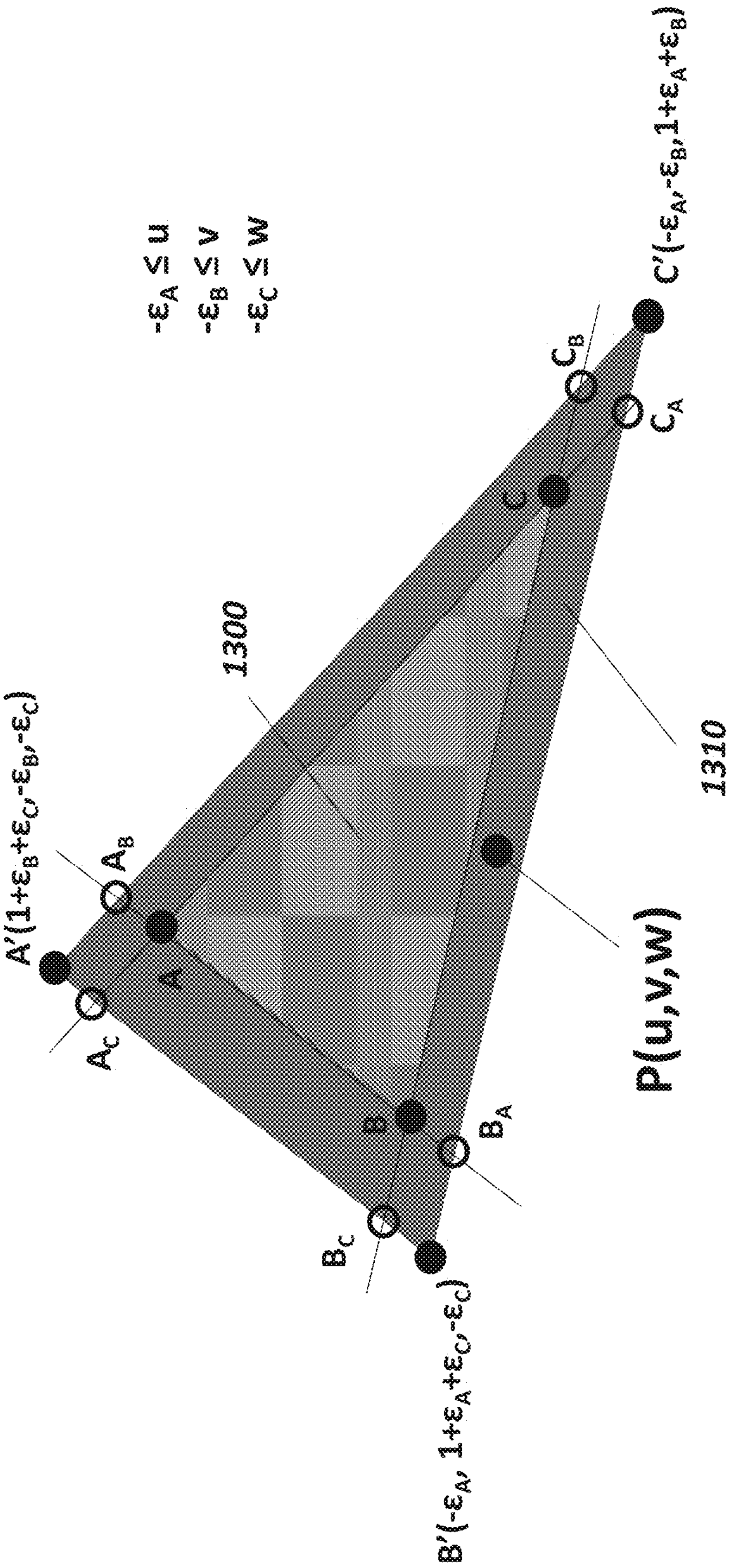
FIG. 13 shows an example of a halo method.

FIG. 13 shows an example of a halo method. More specifically, FIG. 13 shows an example of the halo technique in which the three inequalities 0≤u, v, w of barycentric coordinates u, v, and w may be relaxed into less constraining hull inequalities $-\varepsilon_A \le u$, $-\varepsilon_B \le v$ and $-\varepsilon_C \le w$. The three inequalities 0≤u, v, w of barycentric coordinates u, v, and w may be relaxed into less constraining hull inequalities $-\varepsilon_A \le u$, $-\varepsilon_B \le v$ and $-\varepsilon_C \le w$, for example, by using three halo parameters $\varepsilon_A$, $\varepsilon_B$ and $\varepsilon_C$. These three halo parameters $\varepsilon_A$, $\varepsilon_B$ and $\varepsilon_C$ may be positive values or zero (0) with at least one parameter being positive. The less constraining inequalities may be represented as $\varepsilon_A \le u$, $\varepsilon_B \le v$ and $\varepsilon_C \le w$ where the three halo parameters $\varepsilon_A$, $\varepsilon_B$ and $\varepsilon_C$ may be negative values or zero with at least one parameter being negative. Using/Applying these one or more halo parameters for/to the barycentric coordinates of a point with respect to triangle 1300 may be represented graphically by a halo 1310. The halo 1310 may be added to triangle 1300, for example, all around the three edges AB, BC, and AC of triangle 1300. Halo 1310 may extend the original triangle 1300 to correspond to a new triangle A'B'C'. For the new triangle A'B'C', one or more vertices may be derived, for example, from extending one or more vertices of original triangle 1300 outwards with respect to triangle 1300. By using/applying the one or more three parameters, the three halo vertices A', B' and C' may have barycentric coordinates determined, for example, as $A'(1+\varepsilon_B+\varepsilon_C, -\varepsilon_B, -\varepsilon_C)$, $B'(-\varepsilon_A, 1+\varepsilon_A+\varepsilon_C, -\varepsilon_C)$, and $C'(-\varepsilon_A, -\varepsilon_B, 1+\varepsilon_A+\varepsilon_B)$, respectively. The three halo parameters $\varepsilon_A$, $\varepsilon_B$, and $\varepsilon_C$ may be all equal to a same halo parameter ε. As a result, the halo may be defined by the following inequalities on barycentric coordinates: −ε≤u, v, w. In some examples, each of the three halo parameters $\varepsilon_A$, $\varepsilon_B$, and $\varepsilon_C$ may be set separately and may have different parameter values.

An intersection (e.g., an intersection point) of a ray with the plane to which a TriSoup triangle belongs may be determined. An intersection point of a ray with the plane to which a TriSoup triangle belongs may be determined, for example, in the original Möller-Trumbore algorithm. An intersection point of a ray with the plane to which a TriSoup triangle belongs may be determined, for example, based on computing, for the intersection point, the barycentric coordinates values of u, v, and w. The intersection point may be determined to be in the TriSoup triangle (e.g., on an edge of or within the TriSoup triangle). The intersection point may be determined to be in the TriSoup triangle, for example, based on verifying that each of the barycentric coordinates u, v, and w is greater than or equal to zero (0) (e.g., 0≤u, v, w). The intersection point may be determined as being outside of the TriSoup triangle. The intersection point may be determined as being outside of the TriSoup triangle, for example, based on verifying that at least one of the barycentric coordinates u, v, and w is negative or less than zero (0) (e.g., u<0, v<0, and/or w<0). As described herein, the halo technique may replace one or more of the inequalities in the verification. The halo technique may replace one or more of the inequalities in the verification, for example, based on one or more parameters $\varepsilon_A$, $\varepsilon_B$ and $\varepsilon_C$. One or more of the inequalities may be replaced, for example, by one or more of $-\varepsilon_A \le u$, $-\varepsilon_B \le v$, or $-\varepsilon_C \le w$. The intersection point may be confirmed to be in (or belonging to) the TriSoup triangle extended by its halo, for example, based on whether or not the inequalities $-\varepsilon_A \le u$, $-\varepsilon_B \le v$ and $-\varepsilon_C \le w$ are fulfilled. The halo technique does not increase complexity or significantly increase processing needs.

Figure 14:
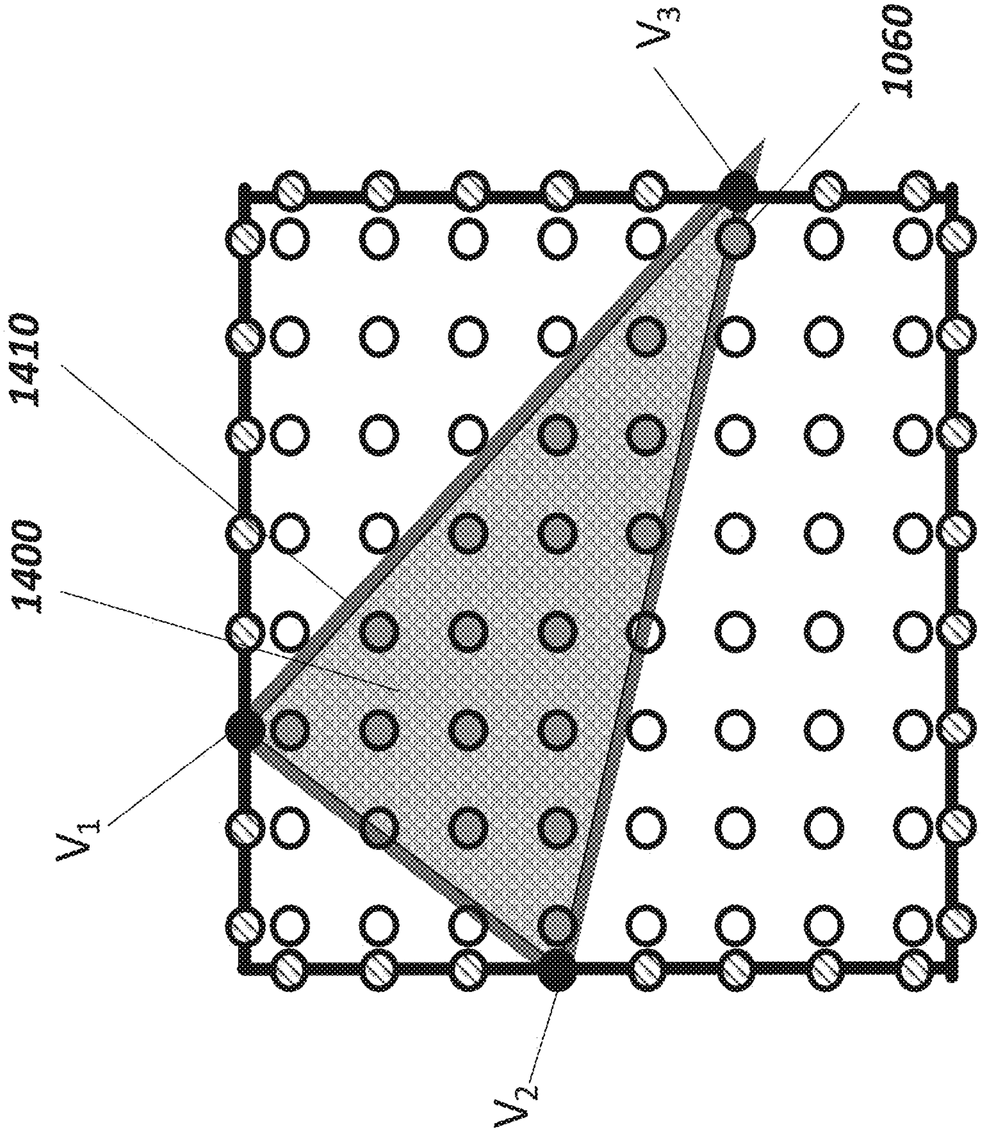
FIG. 14 shows an example of a halo method used for a TriSoup triangle.

FIG. 14 shows an example of a halo method used for a TriSoup triangle. More specifically, FIG. 14 shows an example of the halo technique used for a TriSoup triangle 1050 (from FIG. 10B) to capture missed voxels. A missed voxel may be captured, for example, by adding a halo to the TriSoup triangle. For example, voxel 1060 (which corresponds to the missed voxel 1060*b* of FIG. 10B) may be captured by the halo, for example, by adding a halo 1410 to TriSoup triangle 1050. Better voxel continuity between TriSoup triangles may be obtained through the boundaries of TriSoup nodes, and/or holes (i.e., missing voxels) may be reduced, for example, by adding a halo. Quantitative geometry metrics have been demonstrated to be reduced, for example, by adding the halo. The quantitative geometry metrics may be representative of the amount of error between the original point cloud and the modeled/decoded point cloud.

Voxelizing a first triangle extended by a halo may be performed using different approaches. In a first approach, the voxelization may be based on ray tracing and modifying the Möller-Trumbore algorithm. For example, the original Möller-Trumbore algorithm may determine the intersection point of a ray with the plane to which the first triangle belongs. The original Möller-Trumbore algorithm may compute the barycentric coordinates u, v and w of the intersection point. The original Möller-Trumbore algorithm may determine whether the intersection point belongs to the first triangle, for example, by verifying if $0 \le u, v, w$. In the first approach, one or more of the inequalities may be replaced by $-\varepsilon_A \le u$, $-\varepsilon_B \le v$, and/or $-\varepsilon_C \le w$. One or more of the inequalities may be replaced by $-\varepsilon_A \le u$, $-\varepsilon_B \le v$, and/or $-\varepsilon_C \le w$, for example, based on determined parameters $\varepsilon_A$, $\varepsilon_B$, $\varepsilon_C$. The intersection point may be determined to belong to the first triangle extended by its halo, for example, if $-\varepsilon_A \le u$, $-\varepsilon_B \le v$, and $-\varepsilon_C \le w$. The relaxing of one or more of the inequalities may correspond graphically to a second triangle. The second triangle may be represented by extending one or more vertices of the first triangle outwards with respect to (e.g., the center) of the first triangle.

In a second approach, a second triangle (e.g., with vertices A'B'C') may be determined from the original triangle (e.g., with vertices ABC). The second triangle may be determined from the original triangle, for example, by extending the original triangle by its halo. The second triangle A'B'C' may be used to obtain voxels representing a portion of the point cloud modeled by the triangle. Any triangle voxelizing technique may be used for the second triangle A'B'C' to obtain the voxels. The obtained voxels may represent a portion of the point cloud modeled by the triangle. For example, techniques based on rasterization may be used.

In at least some technologies, the selection of the parameters $\varepsilon_A$, $\varepsilon_B$, and/or $\varepsilon_C$ (or a unique $\varepsilon$) for the halo technique may not be straightforward. For example, it has been observed that increasing the value of the halo parameters tend to improve the peak signal-to-noise ratio (PSNR) of quantitative metrics, even if increased beyond values that induce visual artifacts and decrease qualitative/visual metrics. For solid point clouds, the primary target may be augmented reality (AR)/virtual reality (VR) consumption of 3D content. For solid point clouds, visual quality may be more important than quantitative metrics. On the other hand, setting these parameters to small values may also result in poor visual results, for example, due to missing reconnection between triangles, and may introduce visual holes in the decoded geometry. It is desirable to have a quantitative method to determine values for the halo parameters that provide both good quantitative metrics and good visual quality. In at least some technologies, the halo parameter $\varepsilon$ used for voxelizing TriSoup triangles for the point cloud is a fixed value. The fixed value may be determined as a value that is optimal over a set of test sequences of point clouds, as being the value that maximizes the PSNR metrics, regardless of the visual quality. This fixed value determined from the set of test sequences may not result in consistent quantitative metrics nor visual quality for other test sequences. This fixed value determined from the set of test sequences may not result in consistent quantitative metrics or visual quality for different portions of the point cloud in a given test sequence. This inconsistency may lead to clear visual artifacts and result in poor visual quality.

Examples described herein are directed to determining one or more of the parameters $\varepsilon_A$, $\varepsilon_B$ or $\varepsilon_C$ (or a unique $\varepsilon$) for the halo technique. Examples described herein are directed to determining one or more of the parameters $\varepsilon_A$, $\varepsilon_B$ or $\varepsilon_C$ (or a unique $\varepsilon$) for the halo technique, for example, by considering local characteristics of the TriSoup triangle to which a halo is added. The one or more of the parameters may be set dependent on one or more TriSoup triangle characteristics. The one or more TriSoup triangle characteristics may include, for example, node size, edge lengths of the triangle, triangle size, vertex quantization, etc. The values of the one or more parameters may be dynamic for different portions of the point cloud. The values of the one or more parameters may vary across different point clouds. For example, a first triangle (e.g., a TriSoup triangle) corresponding to a portion of a point cloud may be determined. A parameter may be determined, for example, based on a value that is representative of one or more edge lengths of the first triangle. Points may be determined as belonging to a second triangle. The second triangle may correspond to the first triangle having one or more vertices extended outwards with respect to the first triangle. The one or more vertices may extend outwards with respect to the first triangle, for example, based on the parameter. Ray tracing or rasterization may be applied to (or used for) the second triangle, for example, to determine the points. As another example, ray tracing may be applied to (or used for) the first triangle. Constraints for determining points in the first triangle may be replaced by the one or more parameters. Points belonging to (e.g., within or on an edge of) a second triangle may be determined, for example, based on the one or more parameters. The second triangle may be represented by using/applying the one or more parameters for/to the first triangle. The points may be voxelized to determine voxels representing the portion of the point cloud. The points may be voxelized to determine voxels representing the portion of the point cloud, for example, based on (e.g., based upon) the points having been determined. As the one or more parameters may be dependent on characteristics of the triangle, consistency of voxelization of triangles corresponding to various portions of the point cloud may be achieved.

Figure 15:
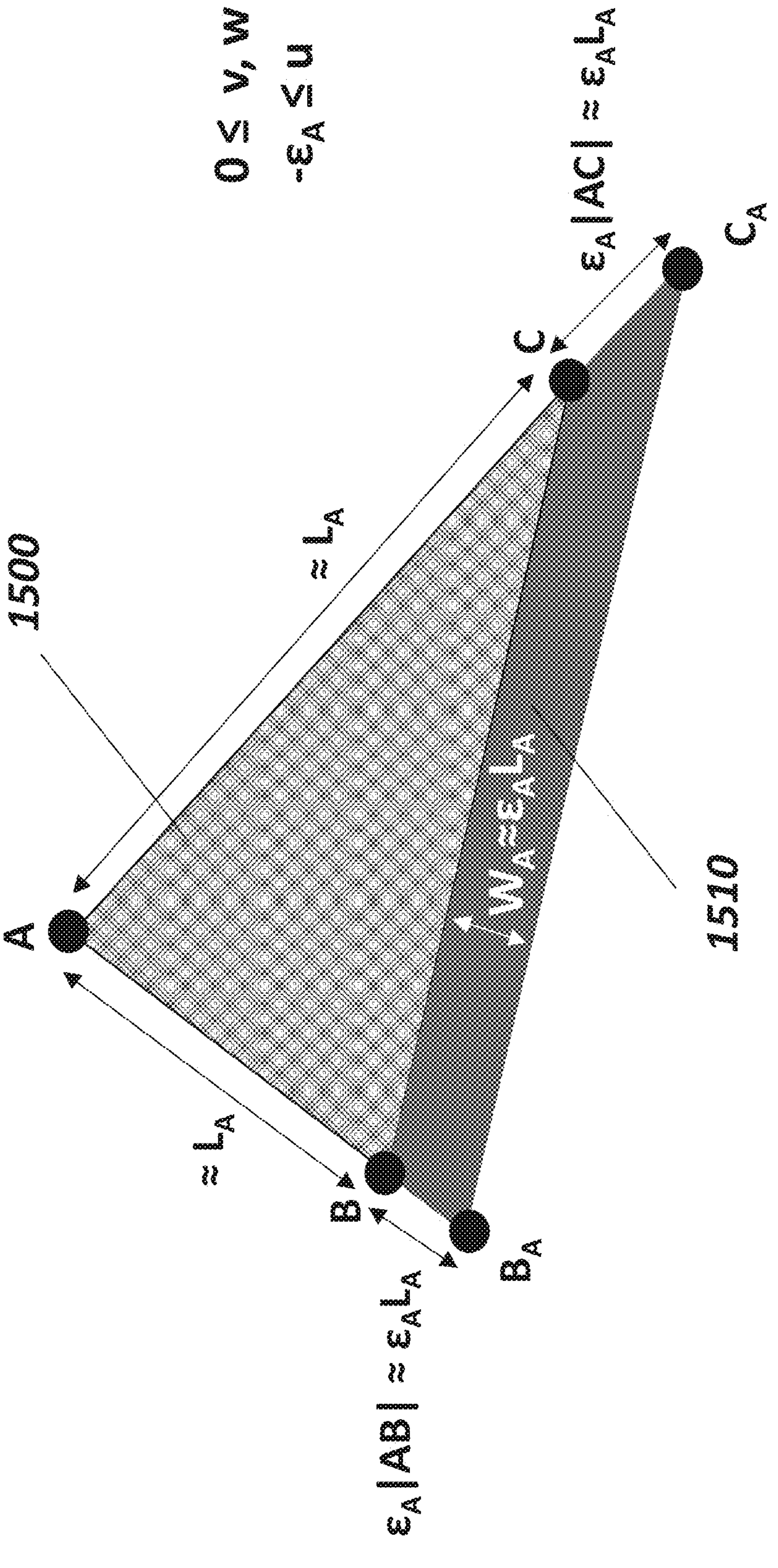
FIG. 15 shows an example of a halo method.

FIG. 15 shows an example of a halo method. More specifically, FIG. 15 shows a triangle 1500 (with vertices A, B, and C) extended by a halo 1510 with a parameter determined based on a characteristic of the triangle 1500.

The size of the halo 1510 may be based on a parameter $\varepsilon_A$. The parameter $\varepsilon_A$ may be determined, for example, based on a characteristic of triangle 1500. The parameter $\varepsilon_A$ may be used for the barycentric coordinate u associated with vertex A, for example, through the inequality $-\varepsilon_A \leq u$. As shown in FIG. 15, a value $L_A$ may be a length that is representative of the lengths $|AB|$ and/or $|AC|$ of the two triangle edges AB and AC having the vertex A as endpoint. The widths $|BB_A|$ and $|CC_A|$ of the halo along the edges $BB_A$ and $CC_A$ are equal to $\varepsilon_A|AB|$ and $\varepsilon_A|AC|$, respectively, as explained herein with respect to FIG. 12. As the value $L_A$ may be a length that is representative of the lengths $|AB|$ and/or $|AC|$, the widths $|BB_A|$ and $|CC_A|$ may also be approximated or represented by a width $W_A$ equal to $\varepsilon_A L_A$.

A parameter (e.g., parameter $\varepsilon_A$) may be associated with a vertex (e.g., vertex A). Changing the parameter (e.g., parameter $\varepsilon_A$) may result in shifting an edge opposite the vertex (e.g., vertex A). For example, increasing (i.e., relaxing) the parameter (e.g., parameter $\varepsilon_A$) may result in shifting the edge opposite the vertex (e.g., vertex A) outwards with respect to the vertex. For example, as shown in FIG. 15, increasing the parameter $\varepsilon_A$ (i.e., relaxing the parameter) associated with vertex A may result in shifting an edge BC opposite the vertex A outwards with respect to the vertex A to a new edge $B_AC_A$ that is parallel to the edge BC. As shown in FIG. 12, two halo vertices $B_A$ and $C_A$ may have barycentric coordinates $B_A(-\varepsilon_A, 1+\varepsilon_A, 0)$ and $C_A(-\varepsilon_A, 0, 1+\varepsilon_A)$, respectively, for example, based on using/applying the parameter $\varepsilon_A$. The following equality may be determined:

$$\overrightarrow{B_AC_A} = (-\varepsilon_A+\varepsilon_A)A+(-1-\varepsilon_A)B+(1+\varepsilon_A)C=(1+\varepsilon_A)(C-B)=(1+\varepsilon_A)\overrightarrow{BC}.$$

This equality shows the two vectors $\overrightarrow{B_AC_A}$ and $\overrightarrow{BC}$ corresponding to the two edges $B_AC_A$ and BC as being colinear, and hence the two edges are parallel with respect to each other.

A width $W_A$ of the halo along the edge BC may correspond to (or be defined by) the distance between the two edges BC and $B_AC_A$. This width may also be similarly defined for three parameters $\varepsilon_A$, $\varepsilon_B$ or $\varepsilon_C$ as shown in FIG. 13. For example, referring to FIG. 13, because $\overrightarrow{B'C'}=(1+\varepsilon_A+\varepsilon_B+\varepsilon_C)\overrightarrow{BC}$, the two lines (B'C') and (BC) corresponding to the two edges B'C' and BC are parallel to each other. A width value $W_A$ may be similarly defined as the distance between these two lines corresponding to the two edges.

A width $W_B$ of the halo along the edge AC may correspond to (or be defined by) the distance between the two edges AC and $A_BC_B$. Because $\overrightarrow{A'C'}=(1+\varepsilon_A+\varepsilon_B+\varepsilon_C)\overrightarrow{AC}$, the two lines (A'C') and (AC) corresponding to the two edges A'C' and AC are parallel to each other. A width value $W_B$ may be similarly defined as the distance between these two lines corresponding to the two edges.

A width $W_C$ of the halo along the edge AB may correspond to (or be defined by) the distance between the two edges AB and $A_CB_C$. Because $\overrightarrow{A'B'}=(1+\varepsilon_A+\varepsilon_B+\varepsilon_C)\overrightarrow{AB}$, the two lines (A'B') and (AB) corresponding to the two edges A'B' and AB are parallel to each other. A width value $W_C$ may be similarly defined as the distance between these two lines corresponding to the two edges.

A width of a halo may be determined (e.g., approximated) by multiplying the parameter with a length of an edge extending from a vertex associated with the parameter. For example, as shown by FIG. 15, the width $W_A$ may be approximated by $\varepsilon_A L_A$. Similarly, widths $W_B$ and $W_C$ (of the halo opposite vertexes B and C, respectively) may be respectively approximated by $\varepsilon_B L_B$ and $\varepsilon_C L_C$. For example, if a unique halo parameter $\varepsilon$ is used for all three of the barycentric coordinates for a point P, and if a value L is a length that is representative of the lengths of the three edges AB, BC and CA of triangle 1500, then the width of the halo along each of the three edges AB, BC, and CA may be approximated. The width of the halo along each of the three edges AB, BC, and CA may be approximated, for example, based on the parameter and the value L as follows: $W_A \approx W_B \approx W_C \approx \varepsilon L$. A unique width W may be defined. The following approximations have been determined (e.g., obtained) to express the parameters as a ratio between widths and lengths.

$$\varepsilon_A \approx W_A/L_A,\ \varepsilon_B \approx W_B/L_B,\ \varepsilon_C \approx W_C/L_C,\ \varepsilon \approx W/L$$

A parameter ($\varepsilon_A$, $\varepsilon_B$, $\varepsilon_C$, and/or $\varepsilon$) may be determined, for example, based on a value ($L_A$, $L_B$, $L_C$, and/or L) that is representative of one or more edge lengths of the triangle for which the halo is used. The parameter may be inversely proportional to the value that is representative of the one or more edge lengths. The value that is representative of the edge lengths of the triangle may be determined for each triangle. The value may not be fixed globally and may vary for a given point cloud and for different portions of the point cloud. This may achieve a dynamically determined parameter.

A parameter ($\varepsilon_A$, $\varepsilon_B$, $\varepsilon_C$, and/or $\varepsilon$) may be determined, for example, based on a desired or target width ($W_A$, $W_B$, $W_C$, W) of the halo. The target width may be fixed or quantitatively determined, as will be further described herein. The parameter may be determined to be proportional to the target width. The target width may be in units of a quantity of voxels (e.g., ¼ or ⅛ of a voxel size).

The value ($L_A$, $L_B$, $L_C$, and/or L) that is representative of one or more of the edge lengths of the triangle may be determined in various ways. The value ($L_A$, $L_B$, $L_C$, and/or L) that is representative of one or more of the edge lengths of the triangle may be determined, for example, based on (e.g., from) the one or more respective lengths of the one or more edges of the triangle. A length ($L_A$) corresponding to edges AB and AC may be determined, for example, based on a mean of the magnitudes of edges AB and AC: $L_A=(|AB|+|AC|)/2$. A value L may be determined, for example, as being representative (or an approximation) of the three edge lengths of the triangle. The value L may be determined, for example, as the mean length of the three edge lengths of the triangle (e.g., $L=(|AB|+|AC|+|BC|)/3$). The value L may be determined, for example, as the longest edge length of the three edge lengths of the triangle (e.g., $L=\max\{|AB|,|AC|,|BC|\}$).

The value (e.g., L) that is representative of the edge lengths of the triangle may be determined, for example, based on the area of the triangle. The value L that is representative of the edge lengths of the triangle may be determined, for example, as the square root of the area S of the triangle, $L=\sqrt{S}$. The area S may be determined, for example, based on the norm of a cross product of two edges of the triangle, e.g., $S=\|\overrightarrow{AB}\times\overrightarrow{AC}\|/2$.

Figure 16B:
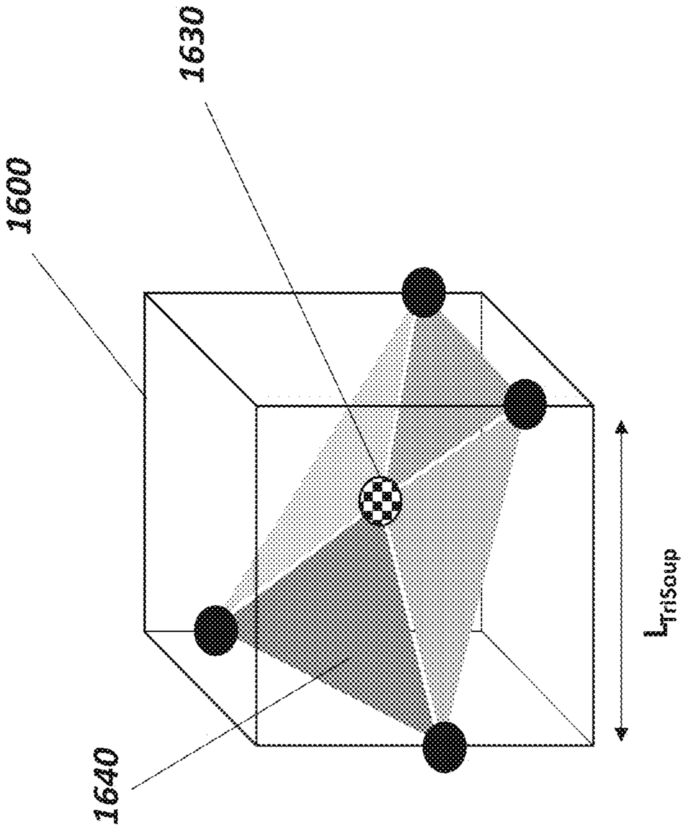
FIG. 16B shows an example of a triangle associated with a TriSoup node.
Figure 16A:
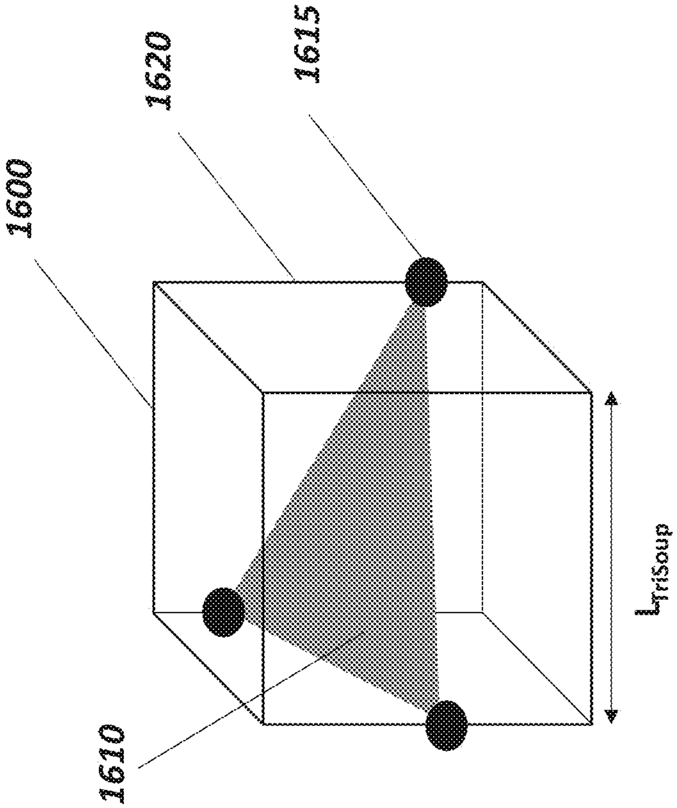
FIG. 16A shows an example of a triangle associated with a TriSoup node.

The triangle may belong to a cuboid corresponding to a TriSoup node. A value ($L_A$, $L_B$, $L_C$, and/or L) that is representative of one or more of the edge lengths of the triangle may be determined (e.g., approximated), for example, based on the size of the TriSoup node, as shown by FIG. 16A and FIG. 16B. A size of the cuboid (corresponding to the TriSoup node) or a length of the cuboid may be representative of edge lengths of the triangle and may be used to determine the value.

FIG. 16A shows an example of a triangle associated with a TriSoup node. More specifically, FIG. 16A shows an example of a triangle 1610 having its vertices 1615 (e.g., all of its vertices 1615) being located on edges 1620 of the cuboid 1600 associated with the TriSoup node. The value ($L_A$, $L_B$, $L_C$, L) that is representative of the edge lengths of the triangle (1610) may be determined (e.g., approximated) by a length $L_{TriSoup}$ and/or a size of the cuboid corresponding to the TriSoup node. For example, the cuboid may have a size that is based on the length: $L_{TriSoup}*L_{TriSoup}*L_{TriSoup}$.

FIG. 16B shows an example of a triangle associated with a TriSoup node. More specifically, FIG. 16B shows an example of a triangle 1640 having one of its vertices being a mean TriSoup vertex 1630. The mean TriSoup vertex 1630 may be located in a cuboid 1600 associated with the TriSoup node. TriSoup triangles may be constructed by pivoting around mean TriSoup vertex 1630. By pivoting around mean TriSoup vertex 1630, TriSoup triangle such as TriSoup triangle 1640 may have two vertices located on the edges of cuboid 1600 and one vertex being mean TriSoup vertex 1630. The area of triangle 1640 may be approximately half the area of triangle 1610 having all vertices located on edges of cuboid 1600. The value ($L_A$, $L_B$, $L_C$, L) that is representative of the edge lengths of the triangle 1640 may be determined, for example, based on $L_{TriSoup}/\sqrt{2}$ instead of $L_{TriSoup}$. As another example, the value ($L_A$, $L_B$, $L_C$, L) that is representative of the edge lengths of a TriSoup triangle may be determined (e.g., approximated), for example, by the size $L_{TriSoup}$ of the TriSoup node and a quantity of iterations of recursively splitting the triangle.

The target width may be quantitatively determined. The target width may be quantitatively determined, for example, based on quantization of vertices of the triangles (e.g., TriSoup triangles). As explained herein, one goal of using/applying the halo technique for/to TriSoup triangles is to ensure consistent reconnection between TriSoup nodes containing the TriSoup triangles. This reconnection may be impacted by the quantization step ΔQ of TriSoup vertices from which TriSoup triangles are constructed. A quantization step ΔQ higher than one, for example, may lead to a hole in the reconnection. The target width may be determined, for example, based on the quantization step such that the halo covers the missing zone of reconnection that has roughly width W=ΔQ−1. The parameter may be determined as a first estimate $\varepsilon_Q$ for an optimal value of the halo parameters $\varepsilon_A$, $\varepsilon_B$ or $\varepsilon_C$ (or a unique ε) as follows:

$$\varepsilon_Q = W/L = \varepsilon_{0,Q}(\Delta Q - 1)/L_{TriSoup}$$

where $\varepsilon_{0,Q}$ is a base halo parameter.

Due to the recursive nature of splitting of the underlying octree, the size of cuboids corresponding to TriSoup nodes may be usually a power of two. For example, $L_{TriSoup}=2^{N_{TriSoup}}$ where $N_{TriSoup}$ is the log 2 of the node size. A number (or quantity) $b_Q$ of bits for representing the TriSoup vertex position along an edge of a cuboid corresponding to a TriSoup node may be set such that the quantization step ΔQ is equal to $2^{N_{TriSoup}-bQ}$.

Figure 17:
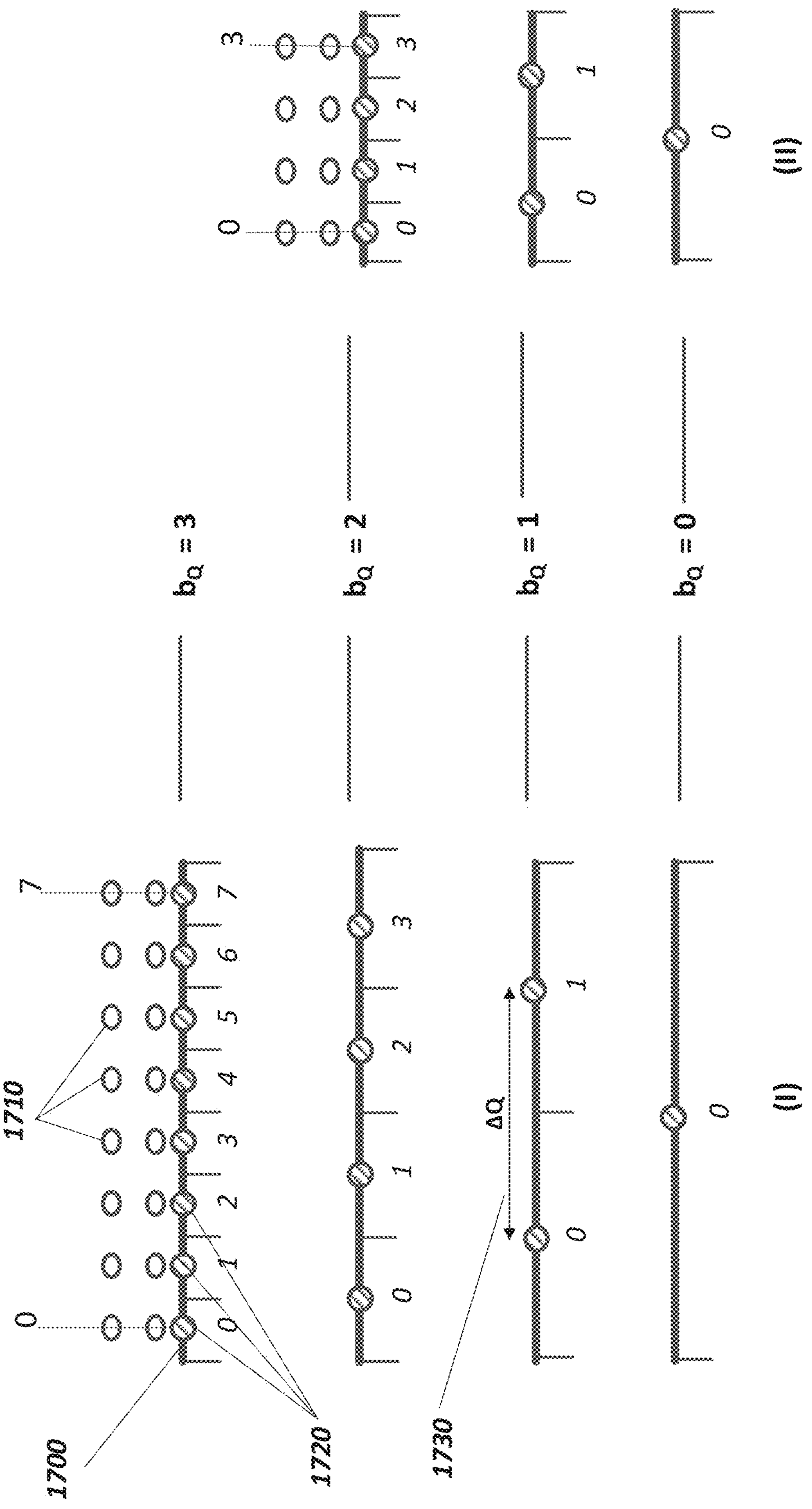
FIG. 17 shows various values of number (or quantity) of bits for representing TriSoup vertex position for a TriSoup node corresponding to a cuboid size.

FIG. 17 shows various values of number (or quantity) of bits for representing TriSoup vertex position for a TriSoup node corresponding to a cuboid size. FIG. 17 shows (at part (I)) various values of number (or quantity) of bits ($b_Q$) for representing TriSoup vertex position for a TriSoup node corresponding to a cuboid of a size of 8 ($N_{TriSoup}=8$). FIG. 17 shows (at part (II)) various values of number (or quantity) of bits ($b_Q$) for representing TriSoup vertex position for a TriSoup node corresponding to a cuboid of size of 4 ($N_{TriSoup}=4$). An edge 1700 of a cuboid associated with a TriSoup node as well as centers 1710 of voxels belonging to the cuboid may be represented. There may be $2^{bQ}$ quantization values. Each of the $2^{bQ}$ quantization values may correspond to a possible quantized position 1720 of a TriSoup vertex along the edge 1700. The quantization step ΔQ is equal to the distance 1730 between two consecutive possible quantized positions 1720 on the edge of the cuboid corresponding to the TriSoup node.

A number (or quantity) of dropped position bits ($b_{dropped}$) during the quantization of TriSoup vertices may be determined. The number (or quantity) of dropped position bits ($b_{dropped}$) during the quantization of TriSoup vertices may be determined, for example, as $b_{dropped}=N_{TriSoup}-b_Q$, and the base halo parameter may be determined as follows:

$$\varepsilon_{0,Q} = \varepsilon_0\left(2^{b_{dropped}} - 1\right)/2^{N_{TriSoup}}.$$

A second estimate $\varepsilon_{samp}$ for an optimal value of the parameter may be obtained from the sampling of TriSoup triangles. A sampling parameter σ may be used, for example, to allow TriSoup for representing sparser point clouds. For example, as explained herein, rays may be launched to voxelize the triangles. In the context of ray-tracing, rays may be launched from integral coordinates that are a multiple of the sampling parameter σ. By doing so, the number (or quantity) of rendered or decoded points may be divided by $\sigma^2$ compared to decoding points without sampling or equivalently compared to the case where the sampling parameter is set to 1 (σ=1). The missing zone of reconnection may be determined to be represented (or approximated) by width W=σ, for σ>1. A second estimate $\varepsilon_{samp}$ for an optimal value of the parameter may be determined, for example, as follows:

$$\varepsilon_{samp} = W/L = \varepsilon_{0,samp}\sigma/L_{TriSoup}$$

The width W may be determined, for example, as the product of the second estimate and the sampling parameter.

Both estimates $\varepsilon_Q$ and $\varepsilon_{samp}$ may be used to determine the base halo parameter. For example, the parameter may be determined as:

$$\varepsilon_{Q,samp} = \max\{\varepsilon_Q, \varepsilon_{samp}\}$$

or

-continued $$\varepsilon_{Q,samp} = \varepsilon_Q + \varepsilon_{samp}$$

The maximum of the two estimates may be used. Additionally, or alternatively, a sum of the two estimates may be used. For example, one or more of the base halo parameters $\varepsilon_{0,Q}$ and $\varepsilon_{0,samp}$ may be fixed. One or more of the base halo parameters $\varepsilon_{0,Q}$ and $\varepsilon_{0,samp}$ may be fixed, for example, based on a size of a voxel (e.g., ⅛ of a voxel size, ¼ of a voxel size, etc.). One or more of the base halo parameters $\varepsilon_{0,Q}$ and $\varepsilon_{0,samp}$ may be determined, for example, based on priors (e.g., assumed intrinsic characteristics) of the original point cloud. For example, one or more of these base halo parameters may be indicated in a syntax element. The syntax element may be transmitted by the encoder, and received and/or decoded by the decoder.

High values for the parameter may lead to degraded visual quality. High values for the parameter may lead to degraded visual quality, for example, due to overstretched rendered triangles. High values of the parameter may result in a large halo. A large halo may increase the number (or quantity) of rendered points and the size of the bitstream of attributes that must be coded for each point of the rendered point cloud. The parameter may be capped by a maximum value $\varepsilon_{max}$. This maximum value $\varepsilon_{max}$ may be determined, for example, such that the halo width does not exceed a given number (or quantity) of voxels $V_{max}$. As an example, the value $V_{max}$ may be equal to a few voxels. As another example, the value of $V_{max}$ may be set to value between 1 and 3, inclusive.

Figure 18:
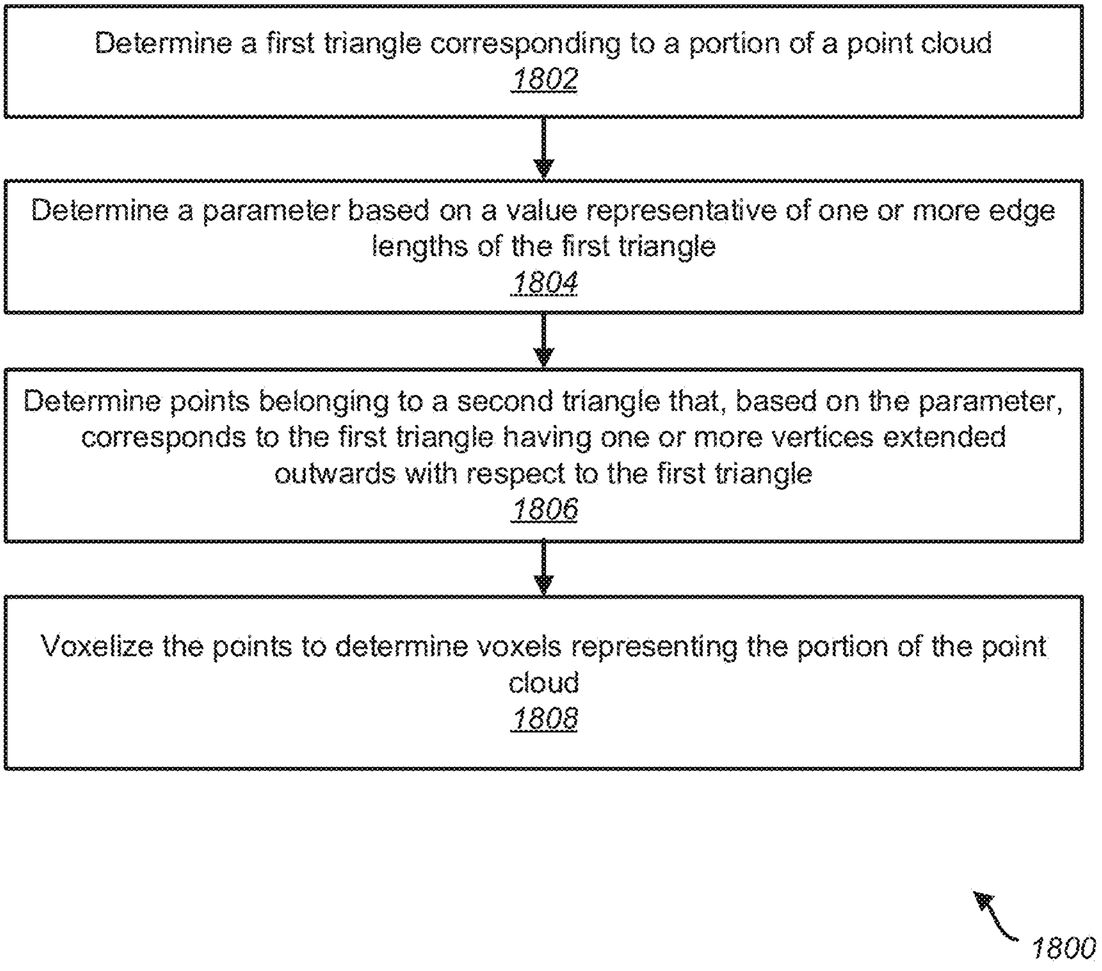
FIG. 18 shows an example method for determining a parameter for voxelizing a triangle corresponding to a portion of a point cloud.

FIG. 18 shows an example method for determining a parameter (e.g., one or more halo parameters) for voxelizing a triangle corresponding to a portion of a point cloud. More specifically, FIG. 18 shows a flowchart 1800 of example method steps for determining a parameter for voxelizing a triangle corresponding to a portion of a point cloud. One or more steps of the example flowchart 1800 may be performed by a decoder (e.g., the decoder 120 as shown in FIG. 1). Although the example method is described herein with respect to a decoder, one or more steps of the example flowchart 1800 may be performed by an encoder (e.g., the encoder 114 as shown in FIG. 1). All or portions of the flowchart 1800 may be implemented by a decoder (e.g., the decoder 120 in FIG. 1), an encoder (e.g., the encoder 114 in FIG. 1), an example computer system 1900 in FIG. 19, and/or an example computing device 2030 in FIG. 20.

At step 1802, a decoder may determine a first triangle corresponding to a portion of a point cloud. For example, the first triangle may be a TriSoup triangle. The first triangle may represent (or model) first points in the portion of the point cloud. An encoder may determine the first triangle to model points in the portion. The encoder may transmit, to the decoder, encoded vertex information of the first triangle in a bitstream. The decoder may decode the vertex information from the bitstream to determine the first triangle.

At step 1804, the decoder may determine a parameter (e.g., a halo parameter or parameter ε). The decoder may determine a parameter (e.g., a halo parameter or parameter ε), for example, based on a value (e.g., value L) that is representative of one or more edge lengths of the first triangle. The value may be representative of at least two edge lengths of the first triangle. In some examples, the value may be representative of all three edge lengths of the first triangle.

The value (e.g., value L) may be determined in various ways. The value may be determined, for example, based on one of the various examples described herein with respect to FIGS. 15, 16A, and/or 16B. The parameter may be determined, for example, based on the value (e.g., value L). The parameter may be determined, for example, as being inversely proportional to the value. The parameter may be determined, for example, based on a maximum halo value ($\varepsilon_{max}$). The maximum halo value ($\varepsilon_{max}$) may be predetermined. The decoder may determine the parameter, for example, based on both the value (e.g., value L) and the maximum halo value ($\varepsilon_{max}$). The decoder may determine an initial value for the parameter, for example, based on the value (e.g., value L). The decoder may determine to replace (or reset) the initial value to the maximum halo value ($\varepsilon_{max}$), for example, if the initial value exceeds the maximum halo value.

The value (e.g., value L) may be determined, for example, based on one or more edge lengths of the first triangle. The value may be determined, for example, based on the mean edge length of the three edges of the first triangle. The value may be determined, for example, based on the max edge length of the three edges of the triangle.

The value (e.g., value L) may be determined, for example, based on the area of the first triangle. The value may be determined, for example, based on a square root of the area. The area may be determined, for example, based on a cross product of two edges of the first triangle. The area of the first triangle may be determined, for example, as half of a magnitude of the cross product.

The first triangle may belong to a cuboid that may correspond to a TriSoup node. The first triangle may contain a portion of a point cloud. The value (e.g., value L) may be, for example, based on a size of the cuboid, as described herein with respect to FIG. 16A and FIG. 16B. For example, the size may comprise a length ($L_{TriSoup}$) of the cuboid. The value (e.g., value L) may be determined, for example, based on a quantity of iterations of recursively splitting triangles in the cuboid.

The parameter may be determined, for example, based on a second value (e.g., a width W) that is representative of a distance between one or more edges of the first triangle and one or more corresponding edges of a second triangle. The distance may correspond to a width of a halo defined between the first triangle and the second triangle, as explained herein with respect to FIG. 12, FIG. 13, and FIG. 15. As an example, the second value may approximate a target distance (e.g., a target width) between one or more edges of the first triangle and one or more corresponding edges of the second triangle. The target distance (e.g., a target width) may be determined, for example, based on the first triangle and the parameter.

The parameter may be determined, for example, based on a second value that is based on a quantization value (e.g., quantization step) of vertices of the first triangle, as explained herein with respect to FIG. 17. For example, the second value may be determined to be proportional to the quantization value. As an example, the second value may be based on a sampling value of the first triangle.

At step 1804, the parameter may be determined. The parameter may be determined, for example, based on the value (e.g., value L) and the second value (e.g., a width W). For example, the parameter may be determined to have a magnitude determined as the second value divided by the value.

At step 1806, the decoder may determine points belonging to a second triangle. The second triangle may correspond to the first triangle having one or more vertices extended outwards with respect to the first triangle. The one or more vertices may extend outwards with respect to the first triangle, for example, based on the parameter. For example, a point of the points belonging to the second triangle may be within the second triangle. A point of the points belonging to the second triangle may be on an edge of the second triangle. The points may be determined for the portion of the point cloud.

The second triangle may be on the same plane as the first triangle. The second triangle may be represented, for example, as the first triangle having one or more vertices extended outwards with respect to the first triangle. For example, the one or more vertices may be extended outwards from a center of the first triangle. For example, the center of the first triangle may be a centroid of the first triangle. For example, the center may be any one of the centroid, the circumcenter, the incenter, or the orthocenter of the first triangle.

The decoder may determine the second triangle, for example, based on the parameter. The decoder may determine the second triangle corresponding to the first triangle having one or more vertices extended outwards with respect to the first triangle. The one or more vertices may extend outwards with respect to the first triangle, for example, based on the parameter. The points belonging to the second triangle may be determined as points of intersections between rays and the second triangle. Each point of the points of intersection may be determined, for example, based on using/applying the Möller-Trumbore algorithm. Each point of the points of intersection may be determined, for example, using three vertices of the second triangle and a ray of the rays. The points may be determined, for example, with respect to the second triangle. The points may be determined, for example, based on determining barycentric coordinates of points of intersection between a ray and a plane of the second triangle. The points may be determined as intersections points that belong to (e.g., within or on an edge of) the second triangle.

The decoder may determine the points, for example, with respect to the first triangle. The points may be determined, for example, based on barycentric coordinates of a point of intersection between a ray and a plane of the first triangle. As an example, the ray may be extended parallel to a coordinate axis in 3D space. As another example, the ray may extend from a ray origin having integral coordinates. The barycentric coordinates may be homogeneous barycentric coordinates. The barycentric coordinates may include an ordered triple of three numbers having a sum equal to one.

The point may be determined as one of the points belonging to the second triangle. The point may be determined, for example, based on each of the three numbers of the ordered triple being greater than or equal to a respective constraint value of three constraint values. The three constraint values may be the same. In some examples, at least one of the three constraint values may be based on the parameter. In some examples, each of the three constraint values may be less than or equal to zero, and at least one of the three constraint values may have a magnitude equal to (or set by) the parameter.

The second triangle may be determined by displacing one or more vertices of the first triangle outwards with respect to the first triangle. The one or more vertices of the first triangle may be displaced outwards with respect to the first triangle, for example, based on the parameter. The points may be determined by projecting the first triangle, in a 3 dimensional (3D) space, into a 2D triangle in a 2D space. The 2D triangle may be rasterized to determine 2D points or pixels representing the 2D triangle. The 2D points or the pixels may be projected back to the 3D space to determine the points. Various rasterization algorithms may be used For example, a digital differential analyzer (DDA) algorithm or a Bresenham algorithm, etc. may be used.

At step 1808, the decoder may voxelize the points to determine voxels representing the portion of the point cloud. Voxelizing the points may include quantizing the points to the voxels from a 3D grid of voxels (i.e., a voxelized grid). Each of the points may be determined to correspond to a voxel. Each of the points may be determined to correspond to a voxel, for example, based on a sub-volume of the voxel including the point. Duplicate voxels may be removed from the voxels, for example, as part of voxelization.

Figure 19:
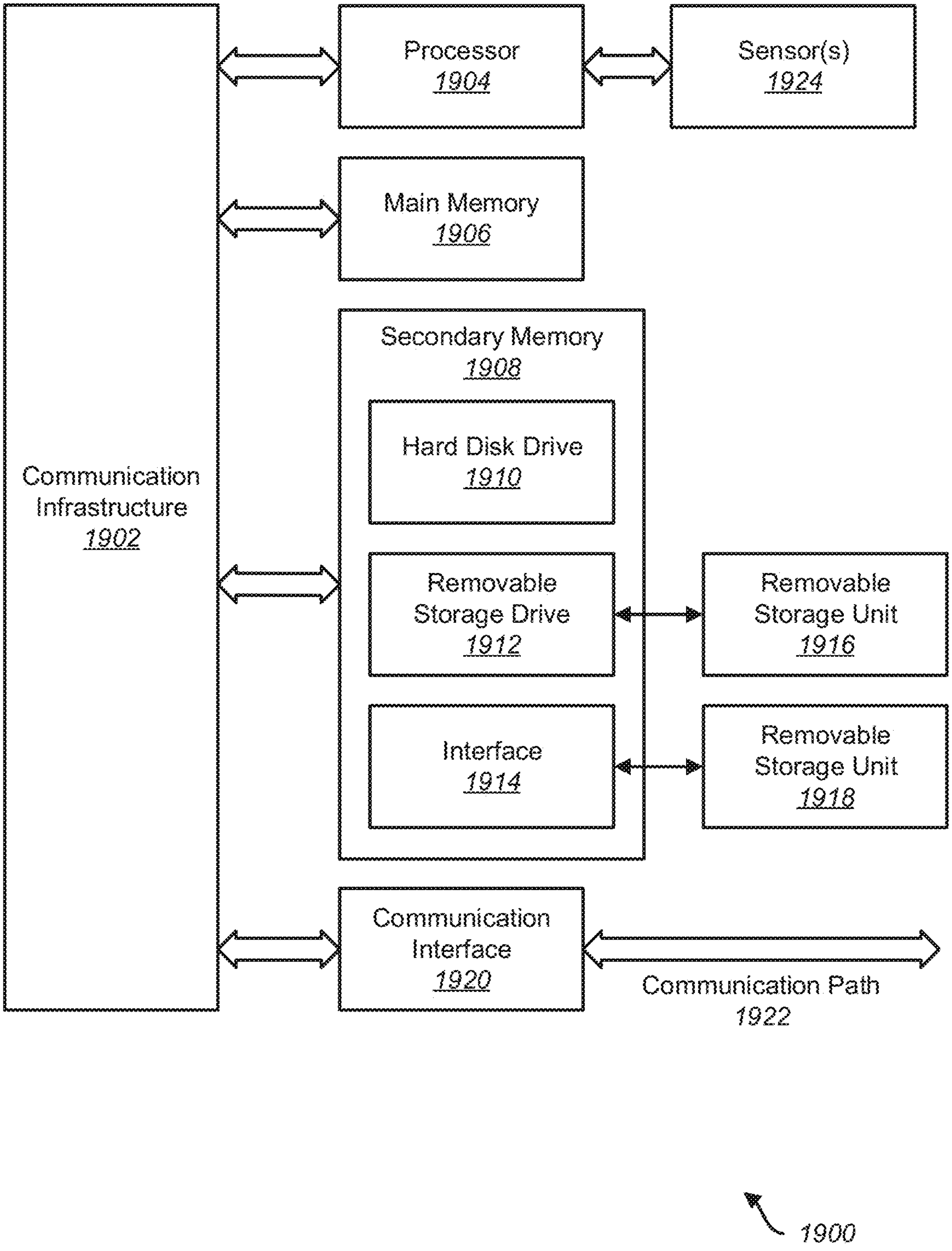
FIG. 19 shows an example computer system in which examples of the present disclosure may be implemented.

FIG. 19 shows an example computer system in which examples of the present disclosure may be implemented. For example, the example computer system 1900 shown in FIG. 19 (e.g., via a block diagram) may implement one or more of the methods described herein. For example, various devices and/or systems described herein (e.g., in FIGS. 1, 2, and 3) may be implemented in the form of one or more computer systems 1900. Furthermore, each of the steps of the flowcharts depicted in this disclosure may be implemented on one or more computer systems 1900.

The computer system 1900 may comprise one or more processors, such as a processor 1904. The processor 1904 may be a special purpose processor, a general purpose processor, a microprocessor, and/or a digital signal processor. The processor 1904 may be connected to a communication infrastructure 1902 (for example, a bus or network). The computer system 1900 may also comprise a main memory 1906 (e.g., a random access memory (RAM)), and/or a secondary memory 1908.

The secondary memory 1908 may comprise a hard disk drive 1910 and/or a removable storage drive 1912 (e.g., a magnetic tape drive, an optical disk drive, and/or the like). The removable storage drive 1912 may read from and/or write to a removable storage unit 1916. The removable storage unit 1916 may comprise a magnetic tape, optical disk, and/or the like. The removable storage unit 1916 may be read by and/or may be written to the removable storage drive 1912. The removable storage unit 1916 may comprise a computer usable storage medium having stored therein computer software and/or data.

The secondary memory 1908 may comprise other similar means for allowing computer programs or other instructions to be loaded into the computer system 1900. Such means may include a removable storage unit 1918 and/or an interface 1914. Examples of such means may comprise a program cartridge and/or cartridge interface (such as in video game devices), a removable memory chip (such as an erasable programmable read-only memory (EPROM) or a programmable read-only memory (PROM)) and associated socket, a thumb drive and USB port, and/or other removable storage units 1918 and interfaces 1914 which may allow software and/or data to be transferred from the removable storage unit 1918 to the computer system 1900.

The computer system 1900 may also comprise a communications interface 1920. The communications interface 1920 may allow software and data to be transferred between the computer system 1900 and external devices. Examples of the communications interface 1920 may include a modem, a network interface (e.g., an Ethernet card), a communications port, etc. Software and/or data transferred via the communications interface 1920 may be in the form of signals which may be electronic, electromagnetic, optical, and/or other signals capable of being received by the communications interface 1920. The signals may be provided to the communications interface 1920 via a communications path 1922. The communications path 1922 may carry signals and may be implemented using wire or cable, fiber optics, a phone line, a cellular phone link, an RF link, and/or any other communications channel(s).

Computer system 1900 may also comprise one or more sensor(s) 1924. Sensor(s) 1924 may measure or detect one or more physical quantities and/or convert the measured or detected physical quantities into an electrical signal in digital and/or analog form. For example, sensor(s) 1924 may include an eye tracking sensor to track the eye movement of a user. A display of a point cloud may be updated, for example, based on the eye movement of a user. Sensor(s) 1924 may include a head tracking sensor to track the head movement of a user. A display of a point cloud may be updated, for example, based on the head movement of a user. Sensor(s) 1924 may include a camera sensor for taking photographs and/or a 3D scanning device. The 3D scanning device may include a laser scanning, structured light scanning, and/or modulated light scanning device. 3D scanning devices may obtain geometry information, for example, by moving one or more laser heads, structured light, and/or modulated light cameras relative to the object or scene being scanned. The geometry information may be used to construct a point cloud.

A computer program medium and/or a computer readable medium may be used to refer to tangible storage media, such as removable storage units 1916 and 1918 or a hard disk installed in the hard disk drive 1910. The computer program products may be means for providing software to the computer system 1900. The computer programs (which may also be called computer control logic) may be stored in the main memory 1906 and/or the secondary memory 1908. The computer programs may be received via the communications interface 1920. Such computer programs, when executed, may enable the computer system 1900 to implement the present disclosure as discussed herein. In particular, the computer programs, when executed, may enable the processor 1904 to implement the processes of the present disclosure, such as any of the methods described herein. Accordingly, such computer programs may represent controllers of the computer system 1900.

Features of the disclosure may be implemented in hardware using, for example, hardware components such as application-specific integrated circuits (ASICs) and gate arrays. Implementation of a hardware state machine to perform the functions described herein will also be apparent to persons skilled in the relevant art(s).

Figure 20:
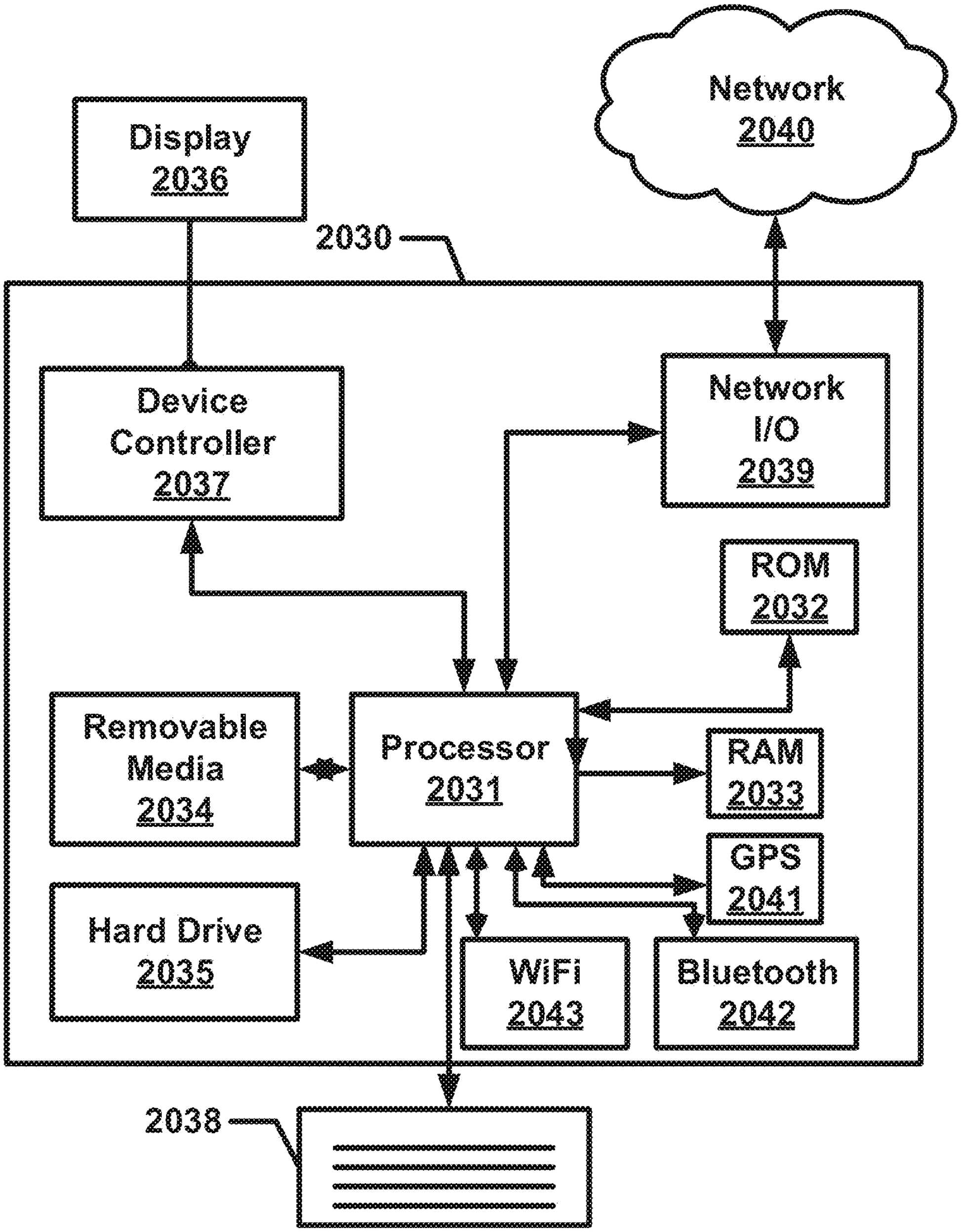
FIG. 20 shows example elements of a computing device that may be used to implement any of the various devices described herein.

FIG. 20 shows example elements of a computing device that may be used to implement any of the various devices described herein. More specifically, FIG. 20 shows example elements of a computing device that may be used to implement any of the various devices described herein, including, for example, a source device (e.g., 102), an encoder (e.g., 114), a destination device (e.g., 106), a decoder (e.g., 120), and/or any computing device described herein. The computing device 2030 may include one or more processors 2031, which may execute instructions stored in the random-access memory (RAM) 2033, the removable media 2034 (such as a Universal Serial Bus (USB) drive, compact disk (CD) or digital versatile disk (DVD), or floppy disk drive), or any other desired storage medium. Instructions may also be stored in an attached (or internal) hard drive 2035. The computing device 2030 may also include a security processor (not shown), which may execute instructions of one or more computer programs to monitor the processes executing on the processor 2031 and any process that requests access to any hardware and/or software components of the computing device 2030 (e.g., ROM 2032, RAM 2033, the removable media 2034, the hard drive 2035, the device controller 2037, a network interface 2039, a GPS 2041, a Bluetooth interface 2042, a WiFi interface 2043, etc.). The computing device 2030 may include one or more output devices, such as the display 2036 (e.g., a screen, a display device, a monitor, a television, etc.), and may include one or more output device controllers 2037, such as a video processor. There may also be one or more user input devices 2038, such as a remote control, keyboard, mouse, touch screen, microphone, etc. The computing device 2030 may also include one or more network interfaces, such as a network interface 2039, which may be a wired interface, a wireless interface, or a combination of the two. The network interface 2039 may provide an interface for the computing device 2030 to communicate with a network 2040 (e.g., a RAN, or any other network). The network interface 2039 may include a modem (e.g., a cable modem), and the external network 2040 may include communication links, an external network, an in-home network, a provider's wireless, coaxial, fiber, or hybrid fiber/coaxial distribution system (e.g., a DOCSIS network), or any other desired network. Additionally, the computing device 2030 may include a location-detecting device, such as a global positioning system (GPS) microprocessor 2041, which may be configured to receive and process global positioning signals and determine, with possible assistance from an external server and antenna, a geographic position of the computing device 2030.

The example in FIG. 20 may be a hardware configuration, although the components shown may be implemented as software as well. Modifications may be made to add, remove, combine, divide, etc. components of the computing device 2030 as desired. Additionally, the components may be implemented using basic computing devices and components, and the same components (e.g., processor 2031, ROM storage 2032, display 2036, etc.) may be used to implement any of the other computing devices and components described herein. For example, the various components described herein may be implemented using computing devices having components such as a processor executing computer-executable instructions stored on a computer-readable medium, as shown in FIG. 20. Some or all of the entities described herein may be software based, and may co-exist in a common physical platform (e.g., a requesting entity may be a separate software process and program from a dependent entity, both of which may be executed as software on a common computing device).

A computing device may perform a method comprising multiple operations. The computing device may determine a first triangle that corresponds to a portion of a point cloud. The computing device may determine a parameter, for example, based on a value representing one or more edge lengths of the first triangle. The computing device may determine one or more points associated with a second triangle. The second triangle may correspond to the first triangle having one or more vertices extended outwards, based on the parameter, with respect to the first triangle. The computing device may determine at least one voxel, of a set of voxels representing the portion of the point cloud, by voxelizing the one or more points. The computing device may determine that the parameter may be inversely proportional to the value. The computing device may determine that the parameter may be less than or equal to a maximal halo value. The computing device may determine the parameter, for example, based on a second value representative of a distance between one or more edges of the first triangle and one or more corresponding edges of the second triangle. The computing device may determine the parameter, for example, based on a second value associated with a quantization value (e.g., quantization step) of vertices of the first triangle. The computing device may determine the parameter, for example, based on a second value associated with a sampling value of the first triangle. The value may represent at least two edge lengths of the first triangle. The value may be determined, for example, based on one or more of: one or more edge lengths of the first triangle; an area of the first triangle; a size of a cuboid associated with the first triangle; a length of the cuboid; or a quantity of iterations of recursively splitting triangles in the cuboid. The point cloud may be associated with a video frame. The first triangle may be a TriSoup triangle. The voxelizing the one or more points may be performed by ray tracing or rasterization. The first triangle may be on a same plane as the second triangle. The computing device may render, based on the at least one voxel, a point cloud frame associated with the portion of the point cloud. The computing device may comprise one or more processors; and memory storing instructions that, when executed by the one or more processors, cause the computing device to perform the described method, additional operations and/or include the additional elements. A system may comprise a first computing device configured to perform the described method, additional operations and/or include the additional elements; and a second computing device configured to encode or decode a point cloud frame. A computer-readable medium may store instructions that, when executed, cause performance of the described method, additional operations and/or include the additional elements.

A computing device may perform a method comprising multiple operations. The computing device may determine a first triangle that corresponds to a portion of a point cloud. The computing device may determine a parameter, for example, based on a value representing one or more characteristics of the first triangle. The computing device may determine a second triangle that may correspond to the first triangle having one or more vertices extended outwards based on the parameter, with respect to the first triangle. The computing device may determine, based on the second triangle, one or more points associated with the portion of the point cloud. The computing device may determine at least one voxel, of a set of voxels representing the portion of the point cloud, by voxelizing the one or more points. The one or more characteristics of the first triangle may comprise one or more of: one or more edge lengths of the first triangle; an area of the first triangle; a size of a cuboid associated with the first triangle; or a quantization value (e.g., quantization step) of vertices of the first triangle. The computing device may determine that the parameter may be inversely proportional to the value. The computing device may determine that the parameter may be less than or equal to a maximal halo value. The computing device may determine the parameter, for example, based on a second value representative of a distance between one or more edges of the first triangle and one or more corresponding edges of the second triangle. The computing device may determine the parameter, for example, based on a second value associated with a quantization value (e.g., quantization step) of vertices of the first triangle. The value may be determined, for example, based on one or more of: one or more edge lengths of the first triangle; an area of the first triangle; a size of a cuboid associated with the first triangle; a length of the cuboid; or a quantity of iterations of recursively splitting triangles in the cuboid. The computing device may render, based on the at least one voxel, a point cloud frame associated with the portion of the point cloud. The computing device may comprise one or more processors; and memory storing instructions that, when executed by the one or more processors, cause the computing device to perform the described method, additional operations and/or include the additional elements. A system may comprise a first computing device configured to perform the described method, additional operations and/or include the additional elements; and a second computing device configured to encode or decode a point cloud frame. A computer-readable medium may store instructions that, when executed, cause performance of the described method, additional operations and/or include the additional elements.

A computing device may perform a method comprising multiple operations. The computing device may determine a first triangle that corresponds to a first portion of a point cloud. The computing device may determine a third triangle that corresponds to a second portion of the point cloud. The computing device may determine a first parameter, for example, based on a first value representing one or more characteristics of the first triangle. The computing device may determine a second parameter, for example, based on a second value representing one or more characteristics of the third triangle. The computing device may determine one or more first points associated with a second triangle. The second triangle may correspond to the first triangle having one or more vertices extended outwards, based on the first parameter, with respect to the first triangle. The computing device may determine one or more second points associated with a fourth triangle. The fourth triangle may correspond to the third triangle having one or more vertices extended outwards, based on the second parameter, with respect to the third triangle. The first parameter may have a different value from the second parameter. The computing device may determine at least one first voxel, of a set of voxels representing the first portion of the point cloud, by voxelizing the one or more first points. The computing device may determine at least one second voxel, of a set of voxels representing the second portion of the point cloud, by voxelizing the one or more second points. The point cloud may be associated with a video frame. The first triangle and the third triangle may be TriSoup triangles. The computing device may voxelize the one or more first points or the one or more second points, by ray tracing or rasterization. The computing device may render, based on the one or more first points and the one or more second points, a point cloud frame. The point cloud frame may be associated with the first portion and the second portion of the point cloud. The computing device may comprise one or more processors; and memory storing instructions that, when executed by the one or more processors, cause the computing device to perform the described method, additional operations and/or include the additional elements. A system may comprise a first computing device configured to perform the described method, additional operations and/or include the additional elements; and a second computing device configured to encode or decode a point cloud frame. A computer-readable medium may store instructions that, when executed, cause performance of the described method, additional operations and/or include the additional elements.

A computing device may perform a method comprising multiple operations. The computing device may determine a first triangle corresponding to a portion of a point cloud. The computing device may determine a parameter, for example, based on a value representative of one or more edge lengths of the first triangle. The computing device may determine points belonging to a second triangle. The second triangle may correspond to the first triangle having one or more vertices extended outwards, based on the parameter, with respect to the first triangle. The computing device may voxelize the points to determine voxels representing the portion of the point cloud. The parameter may be determined as being inversely proportional to the value. The parameter may be determined to be less than or equal to a maximal halo value (ε max). The value may be representative of at least two edge lengths of the first triangle. The value may be determined, for example, based on one or more edge lengths of the first triangle. The value may be determined, for example, based on the mean edge length of the three edges of the first triangle. The value may be determined, for example, based on the max edge length of the three edges of the triangle. The value may be determined, for example, based on the area of the first triangle. The value may be determined, for example, based on a square root of the area. The area of the first triangle may be determined, for example, based on a cross product of two edges of the first triangle. The area of the first triangle may be determined as half of a magnitude of the cross product. The first triangle may belong to a cuboid, corresponding to a TriSoup node, containing the portion of the point cloud. A size of the cuboid may be representative of the one or more edge lengths of the first triangle. The size may comprise a length of the cuboid. The value may be further determined, for example, based on a number of iterations of recursively splitting triangles in the cuboid. The parameter may be determined further based on a second value representative of a distance between one or more edges of the first triangle and one or more corresponding edges of the second triangle. The distance may correspond to a width of a halo defined between the first triangle and the second triangle. The second value may approximate a target distance between one or more edges of the first triangle and one or more corresponding edges of the second triangle to be determined from the first triangle using on the parameter. The parameter may be determined further based on a second value. The second value may be based on a quantization value (e.g., quantization step) of vertices of the first triangle. The second value may be proportional to the quantization value (e.g., quantization step). The parameter may be determined further based on a second value that may be based on a sampling value of the first triangle. The parameter may have a magnitude determined as the second value divided by the value. The computing device may determine a second triangle. The second triangle may correspond to the first triangle having one or more vertices extended outwards, based on the parameter, with respect to the first triangle. The points belonging to the second triangle may be determined as points of intersections between rays and the second triangle. Each point of the points of intersection may be determined, for example, based on applying the Möller-Trumbore algorithm using three vertices of the second triangle and a ray of the ray. The computing device may determine, with respect to the second triangle, barycentric coordinates of points of intersection between a ray and a plane of the second triangle. The computing device may determine, with respect to the first triangle, barycentric coordinates of a point of intersection between a ray and a plane of the first triangle. The ray may be extended parallel to a coordinate axis in 3D space. The ray may extend from a ray origin having integral coordinates. The barycentric coordinates may comprise an ordered triple of three numbers having a sum equal to one. The point may be determined, as one of the points belonging to the second triangle, for example, based on each of the three number of the ordered triple to be greater than or equal to a respective constraint value of three constraint values. The three constraint values may be the same. At least one of the three constraint values may be based on the parameter. Each of the three constraint values may be less than or equal to zero, and at least one of the three constraint values may be negative based on the parameter. The at least one constraint value may have a magnitude value set by the parameter. The computing device may determine a second triangle by displacing, based on the parameter, one or more vertices of the first triangle outwards with respect to the first triangle. The computing device may determine the points by: projecting the first triangle, in a 3 dimensional (3D) space, into a 2D triangle in a 2D space; rasterizing the 2D triangle to determine 2D points or pixels representing the 2D triangle; and projecting the 2D points or the pixels back to the 3D space to determine the points. The rasterizing may comprise applying a digital differential analyzer (DDA) algorithm or a Bresenham algorithm. The voxelizing the points to determine the voxels may comprise removing duplicate voxels from the voxels. The voxelizing the points may comprise quantizing the points to the voxels from a 3D grid of voxels. The first triangle may be a TriSoup triangle. The first triangle may represent first points in the portion of the point cloud. The points belonging to the second triangle may comprise the points being within or on an edge of the second triangle. The points may be determined for the portion of the point cloud. The first triangle may be on the same plane as the second triangle. The second triangle may be determined as representation of the first triangle having one or more vertices extended outwards with respect to the first triangle. The one or more vertices being extended outwards with respect to the first triangle may comprise being extended from a center of the first triangle. The center may comprise one of the centroid, the circumcenter, the incenter, or the orthocenter of the first triangle. The center may comprise the centroid of the first triangle. The computing device may comprise one or more processors; and memory storing instructions that, when executed by the one or more processors, cause the computing device to perform the described method, additional operations and/or include the additional elements. A system may comprise a first computing device configured to perform the described method, additional operations and/or include the additional elements; and a second computing device configured to encode or decode a point cloud frame. A computer-readable medium may store instructions that, when executed, cause performance of the described method, additional operations and/or include the additional elements.

A computing device may perform a method comprising multiple operations. The computing device may determine a first triangle corresponding to a portion of a point cloud. The computing device may determine a parameter, for example, based on a value representative of one or more edge lengths of the first triangle. The computing device may determine a second triangle. The second triangle may correspond to the first triangle having one or more vertices extended outwards, based on the parameter, with respect to the first triangle. The computing device may determine, based on the second triangle, points for the portion of the point cloud. The computing device may voxelize the points to determine voxels representing the portion of the point cloud. The computing device may comprise one or more processors; and memory storing instructions that, when executed by the one or more processors, cause the computing device to perform the described method, additional operations and/or include the additional elements. A system may comprise a first computing device configured to perform the described method, additional operations and/or include the additional elements; and a second computing device configured to encode or decode a point cloud frame. A computer-readable medium may store instructions that, when executed, cause performance of the described method, additional operations and/or include the additional elements.

One or more examples herein may be described as a process which may be depicted as a flowchart, a flow diagram, a data flow diagram, a structure diagram, and/or a block diagram. Although a flowchart may describe operations as a sequential process, one or more of the operations may be performed in parallel or concurrently. The order of the operations shown may be re-arranged. A process may be terminated when its operations are completed, but could have additional steps not shown in a figure. A process may correspond to a method, a function, a procedure, a subroutine, a subprogram, etc. If a process corresponds to a function, its termination may correspond to a return of the function to the calling function or the main function.

Operations described herein may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks. Features of the disclosure may be implemented in hardware using, for example, hardware components such as application-specific integrated circuits (ASICs) and gate arrays. Implementation of a hardware state machine to perform the functions described herein will also be apparent to persons skilled in the art.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein. Computer-readable medium may comprise, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

A non-transitory tangible computer readable media may comprise instructions executable by one or more processors configured to cause operations described herein. An article of manufacture may comprise a non-transitory tangible computer readable machine-accessible medium having instructions encoded thereon for enabling programmable hardware to cause a device (e.g., an encoder, a decoder, a transmitter, a receiver, and the like) to allow operations described herein. The device, or one or more devices such as in a system, may include one or more processors, memory, interfaces, and/or the like.

Communications described herein may be determined, generated, sent, and/or received using any quantity of messages, information elements, fields, parameters, values, indications, information, bits, and/or the like. While one or more examples may be described herein using any of the terms/phrases message, information element, field, parameter, value, indication, information, bit(s), and/or the like, one skilled in the art understands that such communications may be performed using any one or more of these terms, including other such terms. For example, one or more parameters, fields, and/or information elements (IEs), may comprise one or more information objects, values, and/or any other information. An information object may comprise one or more other objects. At least some (or all) parameters, fields, IEs, and/or the like may be used and can be interchangeable depending on the context. If a meaning or definition is given, such meaning or definition controls.

One or more elements in examples described herein may be implemented as modules. A module may be an element that performs a defined function and/or that has a defined interface to other elements. The modules may be implemented in hardware, software in combination with hardware, firmware, wetware (e.g., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and/or complex programmable logic devices (CPLDs). Computers, microcontrollers and/or microprocessors may be programmed using languages such as assembly, C, C++ or the like. FPGAs, ASICs and CPLDs are often programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

One or more of the operations described herein may be conditional. For example, one or more operations may be performed if certain criteria are met, such as in computing device, a communication device, an encoder, a decoder, a network, a combination of the above, and/or the like. Example criteria may be based on one or more conditions such as device configurations, traffic load, initial system set up, packet sizes, traffic characteristics, a combination of the above, and/or the like. If the one or more criteria are met, various examples may be used. It may be possible to implement any portion of the examples described herein in any order and based on any condition.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

The invention claimed is:

1. A method comprising:

determining, by one or more devices, a first triangle that corresponds to a portion of a point cloud;

determining a parameter as inversely proportional to a value representing one or more edge lengths of the first triangle;

determining one or more points associated with a second triangle, wherein the second triangle corresponds to the first triangle having one or more vertices extended outwards, based on the parameter, with respect to the first triangle; and determining at least one voxel, of a set of voxels representing the portion of the point cloud, by voxelizing the one or more points.

2. The method of claim 1, wherein the determining the parameter further comprises determining that the parameter is less than or equal to a maximal halo value.

3. The method of claim 1, wherein the determining the parameter further comprises:

determining the parameter based on a second value representative of a distance between one or more edges of the first triangle and one or more corresponding edges of the second triangle.

4. The method of claim 1, wherein the determining the parameter further comprises:

determining the parameter based on a second value associated with a quantization value of vertices of the first triangle.

5. The method of claim 1, wherein the determining the parameter further comprises:

determining the parameter based on a second value associated with a sampling value of the first triangle.

6. The method of claim 1, wherein the value represents at least two edge lengths of the first triangle.

7. The method of claim 1, wherein the value is determined based on one or more of:

one or more edge lengths of the first triangle;

an area of the first triangle;

a size of a cuboid associated with the first triangle;

a length of the cuboid; or a quantity of iterations of recursively splitting triangles in the cuboid.

8. The method of claim 1, further comprising:

rendering, based on the at least one voxel, a point cloud frame associated with the portion of the point cloud.

9. The method of claim 1, wherein the determining the parameter is further based on a second value associated with a quantity of dropped position bits associated with quantization of vertices of the first triangle.

10. The method of claim 1, further comprising:

based on the parameter being greater than a maximum halo value, setting the parameter to be the maximum halo value.

11. A method comprising:

determining, by one or more devices, a first triangle that corresponds to a portion of a point cloud;

determining a parameter as inversely proportional to a value indicating one or more sizes of the first triangle;

determining a second triangle that corresponds to the first triangle having one or more vertices extended outwards based on the parameter, with respect to the first triangle;

determining, based on the second triangle, one or more points associated with the portion of the point cloud;

determining at least one voxel, of a set of voxels representing the portion of the point cloud, by voxelizing the one or more points; and rendering, based on the at least one voxel, a point cloud frame associated with the portion of the point cloud.

12. The method of claim 11, wherein the one or more sizes of the first triangle comprise one or more of:

one or more edge lengths of the first triangle;

an area of the first triangle;

a size of a cuboid associated with the first triangle; or a quantization value of vertices of the first triangle.

13. The method of claim 11, wherein the determining the parameter further comprises:

determining the parameter based on a second value representative of a distance between one or more edges of the first triangle and one or more corresponding edges of the second triangle.

14. The method of claim 11, wherein the determining the parameter further comprises:

determining the parameter based on a second value associated with a quantization value of vertices of the first triangle.

15. The method of claim 11, wherein the value is determined based on one or more of:

one or more edge lengths of the first triangle;

an area of the first triangle;

a size of a cuboid associated with the first triangle;

a length of the cuboid; or a quantity of iterations of recursively splitting triangles in the cuboid.

16. A method comprising:

determining, by one or more devices, a first triangle that corresponds to a first portion of a point cloud;

determining a third triangle that corresponds to a second portion of the point cloud;

determining a first parameter as inversely proportional to a first value representing one or more sizes of the first triangle;

determining a second parameter as inversely proportional to a second value representing one or more sizes of the third triangle;

determining one or more first points associated with a second triangle, wherein the second triangle corresponds to the first triangle having one or more vertices extended outwards, based on the first parameter, with respect to the first triangle; and determining one or more second points associated with a fourth triangle, wherein the fourth triangle corresponds to the third triangle having one or more vertices extended outwards, based on the second parameter, with respect to the third triangle, wherein the first parameter has a different value from the second parameter.

17. The method of claim 16, further comprising:

determining at least one first voxel, of a set of voxels representing the first portion of the point cloud, by voxelizing the one or more first points; and determining at least one second voxel, of a set of voxels representing the second portion of the point cloud, by voxelizing the one or more second points.

18. The method of claim 16, further comprising:

rendering, based on the one or more first points and the one or more second points, a point cloud frame, wherein the point cloud frame is associated with the first portion and the second portion of the point cloud.

19. The method of claim 16, wherein the first triangle and the third triangle are TriSoup triangles.

20. The method of claim 16, further comprising:

voxelizing the one or more first points or the one or more second points, by ray tracing or rasterization.

* * * * *